US011968697B2

(12) United States Patent
Wang et al.

(10) Patent No.: US 11,968,697 B2
(45) Date of Patent: Apr. 23, 2024

(54) SPATIAL REUSE FOR SIDELINK COMMUNICATIONS

(71) Applicant: QUALCOMM Incorporated, San Diego, CA (US)

(72) Inventors: Xiaojie Wang, Hillsborough, NJ (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 17/399,749

(22) Filed: Aug. 11, 2021

(65) Prior Publication Data
US 2022/0053480 A1    Feb. 17, 2022

Related U.S. Application Data

(60) Provisional application No. 63/066,073, filed on Aug. 14, 2020.

(51) Int. Cl.
*H04W 72/51* (2023.01)
*H04L 5/00* (2006.01)
(Continued)

(52) U.S. Cl.
CPC .......... *H04W 72/51* (2023.01); *H04L 5/0048* (2013.01); *H04W 4/023* (2013.01); *H04W 52/283* (2013.01)

(58) Field of Classification Search
CPC ... H04W 72/51; H04W 4/023; H04W 52/283; H04L 5/0048
See application file for complete search history.

(56) References Cited

U.S. PATENT DOCUMENTS

2020/0344722 A1\* 10/2020 He .......................... H04W 4/46
2022/0217497 A1\* 7/2022 Ebrahim Rezagah ......................
G01S 5/0205
(Continued)

OTHER PUBLICATIONS

Intel Corporation: "Physical Structure for NR V2X", 3GPP Draft, 3GPP TSG RAN WG1 Meeting #98, R1-1908633 Intel—EV2X_SL_L1, 3RD Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765241, 24 Pages, Retrieved from the Internet: URL: http://www.3gpp.org/ftp/tsg_ran/WG1_RL1/TSGR1_98/Docs/R1-1908633.zip [retrieved on Aug. 17, 2019] Par.3, Section 3.5, Sections 5-7, Sections 3.2.3 and 3.2.4.
(Continued)

*Primary Examiner* — Justin T Van Roie
(74) *Attorney, Agent, or Firm* — Holland & Hart LLP

(57) ABSTRACT

The described techniques relate to improved methods, systems, devices, and apparatuses that support spatial reuse for sidelink communications. Generally, the described techniques provide for a user equipment (UE) to reuse resources for receiving sidelink transmissions. The UE may receive a first sidelink control channel that may indicate a set of reserved resources for sidelink communications associated with a second UE. The first UE may decode a second sidelink control channel from the second UE based on the first sidelink control channel. The first UE may determine that the set of resources is available for use based on a result of decoding the second sidelink control channel, a radius of the second sidelink control channel, and the distance between the first UE and the second UE.

30 Claims, 16 Drawing Sheets

(51) Int. Cl.
*H04W 4/02* (2018.01)
*H04W 52/28* (2009.01)

(56) References Cited

U.S. PATENT DOCUMENTS

| | | | |
|---|---|---|---|
| 2022/0217698 A1* | 7/2022 | Lee | H04W 4/023 |
| 2022/0232646 A1* | 7/2022 | Hwang | H04W 52/02 |
| 2022/0264265 A1* | 8/2022 | Kwak | H04W 84/005 |
| 2023/0017247 A1* | 1/2023 | Hwang | H04W 4/023 |
| 2023/0141017 A1* | 5/2023 | Kim | G08G 1/07 |
| | | | 455/456.3 |

OTHER PUBLICATIONS

International Search Report and Written Opinion—PCT/US2021/045733—ISA/EPO—dated Dec. 22, 2021.

Lenovo, et al., "Sidelink Physical Layer Structures in NR V2X", 3GPP Draft, R1-1910144, 3GPP TSG RAN WG1 #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051788951, 6 Pages, Retrieved from the Internet: URL: http://www.3gpp.org/ftp/tsg_ran/WG1_RL1/TSGR1_98b/Docs/R1-1910144.zip [retrieved on Oct. 5, 2019] Paragraph [0002]-Paragraph [0004], Section 2.2.

Nokia, et al., "Discussions on NR V2X Sidelink Physical Layer Structures", 3GPP Draft, R1-1902573-NOKIA-FS_NR_V2X-NR V2X Sidelink Physical Layer Structures, 3rd Generation Partnership Project (3GPP), Mobile Competence Centre, 650, Route Des Lucioles, F-06921 Sophia-Antipol, vol. RAN WG1, No. Athens, Greece, Feb. 25, 2019-Mar. 1, 2019 Feb. 16, 2019 (Feb. 16, 2019), XP051600266, 12 Pages, Retrieved from the Internet: URL: http://www.3gpp.org/ftp/tsg%5Fran/WG1%5FRL1/TSGR1%5F96/Docs/R1%2D1902573%2Ezip [retrieved on Feb. 16, 2019] Second Bullet Point, Paragraph Above Proposal 4 and Section Multiplexing of PSCCH and PSSCH p. 6.

* cited by examiner

SPATIAL REUSE FOR SIDELINK COMMUNICATIONS

CROSS REFERENCE

The present application for patent claims the benefit of U.S. Provisional Patent Application No. 63/066,073 by Wang et al., entitled "SPATIAL REUSE FOR SIDELINK COMMUNICATIONS," filed Aug. 14, 2020, assigned to the assignee hereof, and expressly incorporated by reference herein.

FIELD OF TECHNOLOGY

The following relates to wireless communications, including spatial reuse for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a transmitting UE may transmit sidelink control information (SCI) to one or more neighboring UEs. The SCI may indicate resources that are reserved for retransmissions by the transmitting UE. In some wireless communications systems, the coverage area of the SCI may be increased such that the SCI may be decoded by multiple UEs in the network. In some cases, the reserved resources indicated by the SCI may not be used for retransmissions by the transmitting UE. As a result, the reserved resources may be unused by each UE that received the SCI, which may lead to inefficient use of resources within the wireless communications system.

SUMMARY

The described techniques relate to improved methods, systems, devices, and apparatuses that support spatial reuse for sidelink communications. Generally, the described techniques provide for a user equipment (UE) to reuse resources for receiving sidelink transmissions. For example, a first UE may receive a first sidelink control channel including first stage sidelink control information (SCI) from a transmitting UE. The first stage SCI may be transmitted to the first UE and one or more other sidelink UEs to indicate resources reserved for sidelink communications associated with the transmitting UE, such as retransmissions. By broadcasting the indication of the reserved resources via the first stage SCI to one or more UEs, the transmitting UE may reduce the probability of resource collisions within the network and improve reliability associated with sidelink communications. The first UE may subsequently monitor for and decode a second sidelink control channel from the transmitting UE. In some examples, the second sidelink control channel may include second stage SCI. The second stage SCI may indicate which of the reserved resources the transmitting UE may use for sidelink transmissions. The first UE may determine to use the reserved resources indicated by the first stage SCI based on decoding the second sidelink control channel, or based on a radius of the second sidelink control channel and a distance between the first UE and the second UE. For example, the first UE may determine a difference between the distance between the first UE and the second UE and a radius associated with the second sidelink control channel. This difference may be referred to as an interference-free distance, a reduced-interference distance, or the like, and may be used by the first UE to determine whether to reuse one or more of the reserved resources, such as those that may be usable by the first UE with a reduced interference (e.g., an interference below a threshold).

A method of wireless communications at a first UE is described. The method may include receiving, from a second UE, a first sidelink control channel indicating a set of reserved resources for sidelink communications associated with the second UE, decoding a second sidelink control channel from the second UE based on the first sidelink control channel, and determining that the set of reserved resources is available for use by the first UE based on the decoding of the second sidelink control channel and, a radius of the second sidelink control channel, and a distance between the first UE and the second UE.

An apparatus for wireless communications at a first UE is described. The apparatus may include a processor, memory coupled with the processor, and instructions stored in the memory. The instructions may be executable by the processor to cause the apparatus to receive, from a second UE, a first sidelink control channel indicating a set of reserved resources for sidelink communications associated with the second UE, decode a second sidelink control channel from the second UE based on the first sidelink control channel, and determine that the set of reserved resources is available for use by the first UE based on the decoding of the second sidelink control channel, a radius of the second sidelink control channel, and a distance between the first UE and the second UE.

Another apparatus for wireless communications at a first UE is described. The apparatus may include means for receiving, from a second UE, a first sidelink control channel indicating a set of reserved resources for sidelink communications associated with the second UE, decoding a second sidelink control channel from the second UE based on the first sidelink control channel, and determining that the set of reserved resources is available for use by the first UE based on the decoding of the second sidelink control channel, a radius of the second sidelink control channel, and a distance between the first UE and the second UE.

A non-transitory computer-readable medium storing code for wireless communications at a first UE is described. The code may include instructions executable by a processor to receive, from a second UE, a first sidelink control channel indicating a set of reserved resources for sidelink communications associated with the second UE, decode a second sidelink control channel from the second UE based on the first sidelink control channel, and determine that the set of reserved resources is available for use by the first UE based on the decoding of the second sidelink control channel, a radius of the second sidelink control channel, and a distance between the first UE and the second UE.

Some examples of the method, apparatuses, and non-transitory computer-readable medium described herein may further include operations, features, means, or instructions for determining that the decoding of the second sidelink control channel may be successful, and determining the radius of the second sidelink control channel based on determining that the decoding of the second sidelink control channel may be successful, where the set of reserved resources may be determined to be available based on a first distance corresponding to a difference between the distance between the first UE and the second UE and the radius of the second sidelink control channel exceeding a threshold distance.

Some examples of the method, apparatuses, and non-transitory computer-readable medium described herein may further include operations, features, means, or instructions for determining the threshold distance based on a second distance between the second UE and a target UE associated with the first sidelink control channel and a pathloss between the first UE and the second UE.

Some examples of the method, apparatuses, and non-transitory computer-readable medium described herein may further include operations, features, means, or instructions for identifying a modulation and coding scheme (MCS), a beta offset, a control format, or any combination thereof associated with the second sidelink control channel based on the decoding of the first sidelink control channel, and determining the second distance between the second UE and the target UE based on the MCS, the beta offset, the control format, or any combination thereof associated with the second sidelink control channel.

Some examples of the method, apparatuses, and non-transitory computer-readable medium described herein may further include operations, features, means, or instructions for receiving a reference signal with the first sidelink control channel, the second sidelink control channel, or a sidelink data channel, or any combination thereof, where the pathloss between the first UE and the second UE may be determined based on a power measurement associated with the reference signal.

In some examples of the method, apparatuses, and non-transitory computer-readable medium described herein, the power measurement may be a reference signal received power (RSRP), a reference signal strength indicator (RSSI), or a combination thereof.

Some examples of the method, apparatuses, and non-transitory computer-readable medium described herein may further include operations, features, means, or instructions for determining the threshold distance based on an alpha factor corresponding to a pathloss exponent, a signal to interference plus noise ratio (SINR) target, a spatial transmission type, or any combination thereof.

Some examples of the method, apparatuses, and non-transitory computer-readable medium described herein may further include operations, features, means, or instructions for determining a transmit power for communicating with a target UE using the set of reserved resources based on the radius of the second sidelink control channel and the distance between the first UE and the second UE.

Some examples of the method, apparatuses, and non-transitory computer-readable medium described herein may further include operations, features, means, or instructions for receiving one or more additional sidelink control channels, each additional sidelink control channel indicating a respective set of reserved resources for sidelink communications, determining a subset of reserved resources that may be available for use by the first UE, the subset of reserved resources being from the respective sets of reserved resources and the set of reserved resources, and communicating with a target UE using the subset of reserved resources.

Some examples of the method, apparatuses, and non-transitory computer-readable medium described herein may further include operations, features, means, or instructions for determining the subset of reserved resources based on respective transmit powers for the one or more additional sidelink control channels.

Some examples of the method, apparatuses, and non-transitory computer-readable medium described herein may further include operations, features, means, or instructions for determining respective distances for the one or more additional sidelink control channels based on respective successful decoding procedures for the one or more additional sidelink control channels, and determining the subset of reserved resources based on the respective distances associated with the one or more additional sidelink control channels.

Some examples of the method, apparatuses, and non-transitory computer-readable medium described herein may further include operations, features, means, or instructions for selecting a subchannel from a set of subchannels for sidelink communications with a target UE via the set of reserved resources, where the subchannel may be different from a subchannel used for the first sidelink control channel.

Some examples of the method, apparatuses, and non-transitory computer-readable medium described herein may further include operations, features, means, or instructions for receiving an indication of a subchannel index of the first sidelink control channel within a field of the first sidelink control channel, and selecting a subchannel from a set of subchannels for sidelink communications with a target UE via the set of reserved resources, where the subchannel may be associated with an index different from the subchannel index.

Some examples of the method, apparatuses, and non-transitory computer-readable medium described herein may further include operations, features, means, or instructions for determining a subchannel associated with the first sidelink control channel, and transmitting a third sidelink control channel indicating the set of reserved resources available for use by the first UE using the subchannel based on a priority, a demodulation reference signal (DMRS) pattern, and a subsequent control channel format being the same for the third sidelink control channel and a subsequent control channel.

Some examples of the method, apparatuses, and non-transitory computer-readable medium described herein may further include operations, features, means, or instructions for communicating with a target UE via the set of reserved resources based on determining that the set of reserved resources may be available for use by the first UE.

A method of wireless communications at a first UE is described. The method may include receiving, from a second UE, a first sidelink control channel indicating a set of reserved resources for sidelink communications associated with the second UE, monitoring for a second sidelink control channel from the second UE based on the first sidelink control channel, and determining that the set of reserved resources is available for use by the first UE based on the monitoring of the second sidelink control channel, where the set of reserved resources is determined to be available based on an unsuccessful decoding of the second sidelink control channel.

An apparatus for wireless communications at a first UE is described. The apparatus may include a processor, memory coupled with the processor, and instructions stored in the memory. The instructions may be executable by the processor to cause the apparatus to receive, from a second UE, a first sidelink control channel indicating a set of reserved resources for sidelink communications associated with the second UE, monitor for a second sidelink control channel from the second UE based on the first sidelink control channel, and determine that the set of reserved resources is available for use by the first UE based on the monitoring of the second sidelink control channel, where the set of reserved resources is determined to be available based on an unsuccessful decoding of the second sidelink control channel.

Another apparatus for wireless communications at a first UE is described. The apparatus may include means for receiving, from a second UE, a first sidelink control channel indicating a set of reserved resources for sidelink communications associated with the second UE, monitoring for a second sidelink control channel from the second UE based on the first sidelink control channel, and determining that the set of reserved resources is available for use by the first UE based on the monitoring of the second sidelink control channel, where the set of reserved resources is determined to be available based on an unsuccessful decoding of the second sidelink control channel.

A non-transitory computer-readable medium storing code for wireless communications at a first UE is described. The code may include instructions executable by a processor to receive, from a second UE, a first sidelink control channel indicating a set of reserved resources for sidelink communications associated with the second UE, monitor for a second sidelink control channel from the second UE based on the first sidelink control channel, and determine that the set of reserved resources is available for use by the first UE based on the monitoring of the second sidelink control channel, where the set of reserved resources is determined to be available based on an unsuccessful decoding of the second sidelink control channel.

Some examples of the method, apparatuses, and non-transitory computer-readable medium described herein may further include operations, features, means, or instructions for receiving one or more additional sidelink control channels, each additional sidelink control channel indicating a respective set of reserved resources for sidelink communications, determining a subset of reserved resources that may be available for use by the first UE, the subset of reserved resources being from the respective sets of reserved resources and the set of reserved resources, and communicating with a target UE using the subset of reserved resources.

Some examples of the method, apparatuses, and non-transitory computer-readable medium described herein may further include operations, features, means, or instructions for determining the subset of reserved resources based on respective transmit powers for the one or more additional sidelink control channels.

Some examples of the method, apparatuses, and non-transitory computer-readable medium described herein may further include operations, features, means, or instructions for selecting a subchannel from a set of subchannels for sidelink communications with a target UE via the set of reserved resources, where the subchannel may be different from a subchannel used for the first sidelink control channel.

Some examples of the method, apparatuses, and non-transitory computer-readable medium described herein may further include operations, features, means, or instructions for receiving an indication of a subchannel index of the first sidelink control channel within a field of the first sidelink control channel, and selecting a subchannel from a set of subchannels for sidelink communications with a target UE via the set of reserved resources, where the subchannel may be associated with an index different from the subchannel index.

Some examples of the method, apparatuses, and non-transitory computer-readable medium described herein may further include operations, features, means, or instructions for determining a subchannel associated with the first sidelink control channel, and transmitting a third sidelink control channel indicating the set of reserved resources available for use by the first UE using the subchannel based on a priority, a DMRS pattern, and a subsequent control channel format being the same for the third sidelink control channel and a subsequent control channel.

Some examples of the method, apparatuses, and non-transitory computer-readable medium described herein may further include operations, features, means, or instructions for communicating with a target UE via the set of reserved resources based on determining that the set of reserved resources may be available for use by the first UE.

Some examples of the method, apparatuses, and non-transitory computer-readable medium described herein may further include operations, features, means, or instructions for determining a transmit power for communicating with a target UE via the set of reserved resources based on the unsuccessful decoding of the second sidelink control channel.

DETAILED DESCRIPTION

Figure 1:
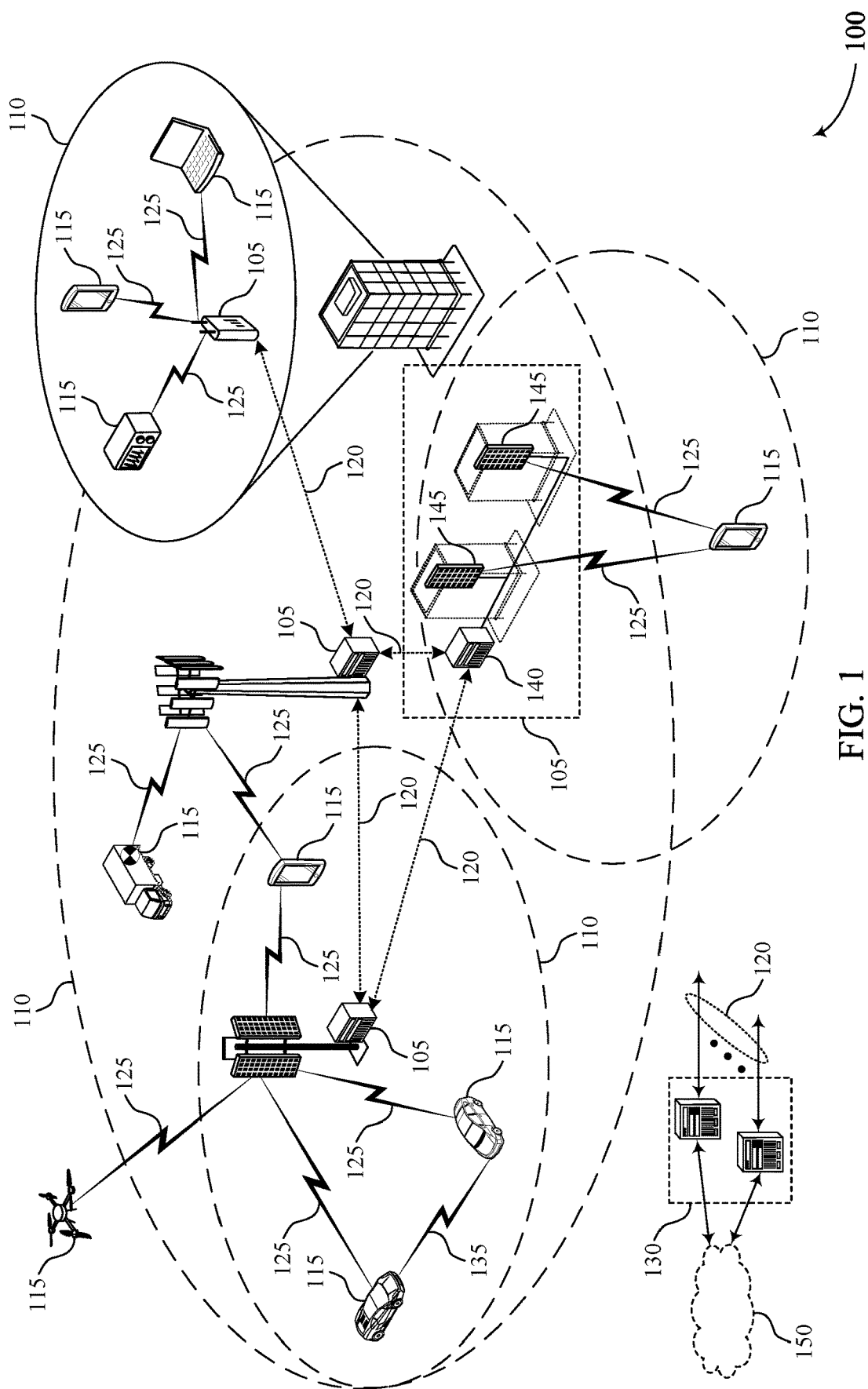
FIG. 1 illustrates an example of a system for wireless communications that supports spatial reuse for sidelink communications in accordance with aspects of the present disclosure.

In some wireless communications systems, a device in the network (e.g., a user equipment (UE), base station, or some other node) may convey sidelink channel information (SCI) to another device (e.g., another sidelink device). The SCI may be conveyed in one or more stages. For example, a first UE may transmit a first stage SCI (e.g., SCI1) to each neighboring sidelink UE in the network. The first stage SCI may indicate resources that are reserved for retransmissions (e.g., physical sidelink shared channel (PSSCH) resources). To improve reliability, the coverage area of the first stage SCI may be increased (e.g., the transmit power used for SCI1 transmissions may be increased) so that neighboring UEs may decode the first stage SCI and identify the reserved resources with a higher probability to reduce interference (e.g., neighboring UEs may receive SCI1 and refrain from using the reserved resources indicated by the SCI1 when performing sidelink communications with other UEs). The first device may subsequently transmit a second stage SCI (e.g., SCI2) via a second sidelink control channel. In some cases, the second sidelink control channel including the second stage SCI may be transmitted via the PSSCH resources indicated by the first stage SCI (e.g., the SCI2 may be transmitted in one or more slots of the reserved PSSCH) to indicate which of the reserved resources the first device may use. To reduce interference during the transmission of the second stage SCI, the transmitting UE may transmit the second stage SCI via a smaller coverage area than the first stage SCI. As such, the area of throughput for sidelink transmissions may be limited by the radius of the first stage SCI coverage. In some cases, the reserved resources may not be used for retransmissions (e.g., reused) by the first UE or other UEs.

As described herein, a sidelink UE that receives first stage SCI may reuse the reserved resources indicated by the first stage SCI to improve the throughput for sidelink transmissions and reduce the number of unused resources. For example, a transmitting UE may transmit (e.g., broadcast) a first stage SCI for sidelink communications to a first sidelink UE and one or more other sidelink UEs in the network via a physical sidelink control channel (PSCCH). The first stage SCI may indicate reserved resources where one or more UEs intended to receive the corresponding sidelink transmission may decode the second stage SCI. However, in some cases, a UE may refrain from decoding the second stage SCI (e.g., the UE may be out of the coverage area of the second stage SCI, the UE may be unable to decode the resources indicated by the first stage SCI, the UE may not intend to receive the corresponding sidelink transmissions, or a combination thereof), and the UE may instead determine to reuse the resources indicated as reserved by the first stage SCI. Additionally, or alternatively, the UE may determine to use the reserved resources if the UE determines that it is a safe distance from the transmitting UE (e.g., an interference-free distance). The UE may reuse the resources with reduced interference by performing one or more distance measurements and one or more power measurements to determine a transmit power and transmit resources for reusing the indicated resources without interfering with the original SCI transmissions.

In some examples, to determine an interference-free area for reusing the indicated PSSCH resources, the sidelink UE may measure a radio frequency (RF) distance to the boundary of the PSSCH coverage area. For example, to obtain an RF distance the UE may perform a power measurement to estimate a distance to the transmitting UE. In one example, the UE may perform the power measurement using demodulation reference signals (DMRSs) in the first and second stage SCI to estimate the pathloss to the transmitter (e.g., a loss of reference signal received power (RSRP), such as $PL_{RSRP}$) and the UE may determine a distance, D, to the transmitter according to the pathloss estimate. The UE may determine the radius of the PSSCH coverage area, $R_2$, based on information decoded in the first stage SCI (e.g., the UE may decode the SCI1 and identify one or more of a modulation and coding scheme (MCS), beta offset, and a format of the PSSCH resources). Thus, the UE may determine an interference-free RF distance by subtracting the radius of the PSSCH coverage area from the distance between the UE and the transmitting UE (e.g., the RF distance, $d_2$, may be determined by $d_2=D-R_2$). The UE may thereby reuse the resources indicated by the first stage SCI within a coverage area of radius $d_2$.

If the sidelink UE determines to reuse the resources, the sidelink UE may broadcast a new first stage SCI transmission to other receiving sidelink UEs to indicate to each UE that the resources are occupied and to indicate where the receiving UEs may decode the sidelink transmissions. The UE may use one or more methods to reduce interference with the existing first stage SCI transmission (e.g., such that the coverage area of the new first stage SCI transmission may not overlap with the coverage area of the existing first stage SCI transmission). In one example, the UE may refrain from transmitting the first stage SCI via the subchannel containing the existing first stage SCI (e.g., the existing subchannel may not be reused). In another example, the position of the first stage SCI may be relaxed such that the UE may transmit the new transmission of the first stage SCI in a separate subchannel (e.g., the UE may indicate the new subchannel to the receiving UEs via a field in SCI). In another example, the UE may determine a transmit power for transmitting the new first stage SCI based on the interference-free distance, a result of a decoding process for the existing SCI, or both. Additionally, or alternatively, the new first stage SCI may include the same information as the existing first SCI, and the UE may transmit the new first stage SCI via the same subchannel as the existing first stage SCI.

By determining to reuse the reserved resources indicated by a first stage SCI, a receiving UE may increase the throughput available for sidelink transmissions, and the UE may reduce latency associated with sidelink communications.

Aspects of the disclosure are initially described in the context of wireless communications systems. Additional aspects are described in the with reference to coverage area diagrams and process flows. Aspects of the disclosure are further illustrated by and described with reference to apparatus diagrams, system diagrams, and flowcharts that relate to spatial reuse for sidelink communications.

FIG. 1 illustrates an example of a wireless communications system 100 in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier (ID) for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may reuse resources for receiving sidelink transmissions. For example, a first UE 115 may receive a first stage SCI from a transmitting UE 115. The first stage SCI may be transmitted, or broadcast to the first UE 115 and one or more other sidelink UEs 115 to indicate resources reserved for retransmissions and to reduce interference. The first UE 115 may subsequently monitor for second stage SCI from the transmitting UE 115. In some examples, the second stage SCI may be transmitted via the reserved resources indicated by the first stage SCI, which may be resources of a sidelink data channel, such as a PSSCH. The second stage SCI may indicate which of the reserved resources the transmitting UE 115 may use for sidelink transmissions. The first UE 115 may determine to use the reserved resources indicated by the first stage SCI if the first UE 115 fails to decode the second stage SCI, or if the first UE 115 determines that the transmitting UE 115 is a safe distance from the first UE 115. For example, the transmitting UE 115 may transmit the first stage SCI within a larger coverage area than the second stage SCI, and the first UE 115 may be within the first stage SCI coverage area but not within the second stage SCI coverage area. The first UE 115 may determine to reuse the resources within an interference-free area. The first UE 115 may determine that the set of resources is available for use based on monitoring for the second control channel, an unsuccessful decoding of the second sidelink control channel, or the interference-free distance of the first UE 115.

Figure 2:
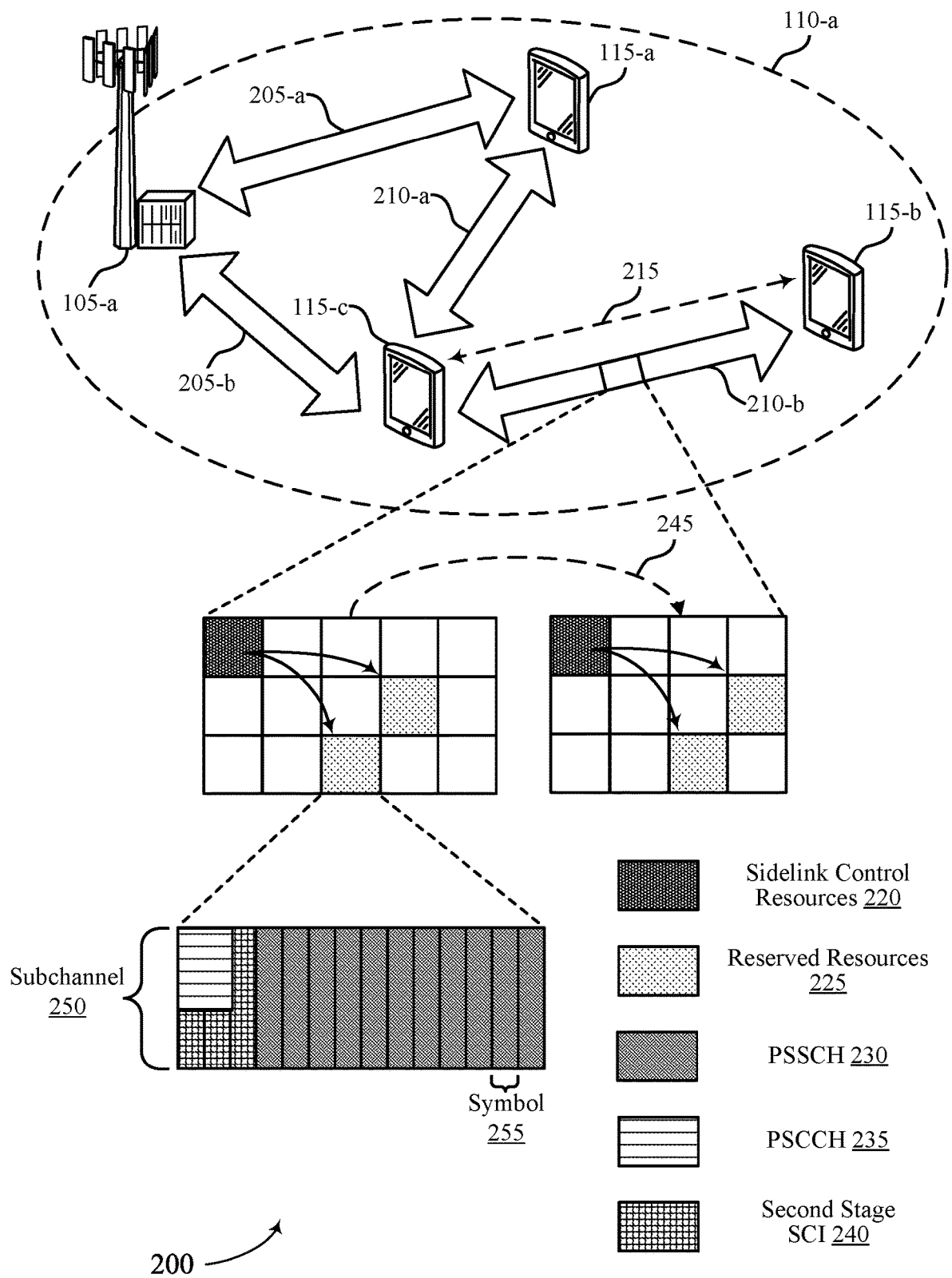
FIG. 2 illustrates an example of a system for wireless communications that supports spatial reuse for sidelink communications in accordance with aspects of the present disclosure.

FIG. 2 illustrates an example of a wireless communications system 200 in accordance with various aspects of the present disclosure. The wireless communications system 200 may include a base station 105-a and UEs 115-a, 115-b, and 115-c, which may be examples of a base station 105 and a UE 115 as described with reference to FIG. 1. Base station 105-a and UEs 115-a and 115-c may communicate within geographic coverage area 110-a and via communication links 205-a and 205-b, respectively. UE 115-c may communicate with UEs 115-a and 115-b via sidelink communication links 210-a and 210-b, respectively. In some examples, UE 115-c may transmit SCI to UEs 115-a and 115-b via the sidelink control resources 220, and the SCI may include an indication of resources reserved for retransmissions by UE 115-*c* (e.g., the reserved resources 225). In some examples, UEs 115-*a* and 115-*b* may determine to reuse one or more of the reserved resources 225.

In some wireless communications systems 200, a device in the network (e.g., a UE 115, base station 105, or some other node) may convey SCI to another device (e.g., another sidelink device or vehicle-to-everything (V2X) device). The SCI may be conveyed in one or more stages. For example, sidelink UE 115-*c* may transmit a first stage SCI (e.g., SCI1) to each sidelink UE 115 in the network (e.g., UEs 115-*a* and 115-*b*) via the sidelink communication links 210. The first stage SCI may indicate resources that are reserved by UE 115-*c* for retransmissions (e.g., the SCI1 may indicate the reserved resources 225), and each sidelink UE 115 may decode the first stage SCI to determine where the reserved resources 225 are located (e.g., to refrain from using resources that are reserved for another sidelink transmission and to reduce resource collision within the wireless communications system 200). In one example, (e.g., during Mode 2 sidelink operations), the sidelink UEs 115 may perform channel sensing (e.g., blindly decoding each PSCCH 235) to locate resources reserved by other sidelink transmissions, and the first stage SCI may reduce the need for sensing each channel (e.g., the first stage SCI may include an explicit indication such that the UEs 115 may refrain from blindly decoding each channel). The first stage SCI may be transmitted via the sidelink control resources 220, which may be configured resources (e.g., time or frequency resources) transmitted via a PSCCH 235. In some examples, the PSCCH 235 may be configured to occupy a number of physical resource blocks (PRBs) within a single subchannel 250 (e.g., 10, 12, 15, 20, 25, or some other number of PRBs within the subchannel 250), and the duration of the PSCCH 235 may be configured (e.g., the PSCCH 235 may span two symbols, three symbols, or some other number of symbols 255).

The first stage SCI may include one or more fields to indicate a location of the reserved resources 225. For example, the first stage SCI may include one or more fields to convey a frequency domain resource allocation (FDRA), a time domain resource allocation (TDRA), a resource reservation period 245 (e.g., a period for repeating the SCI transmission and the corresponding reserved resources 225), an MCS for a second stage SCI 240, a beta offset value for the second stage SCI 240, a DMRS port (e.g., one bit indicated a number of data layers), a physical sidelink feedback channel (PSFCH) overhead indicator, a priority, one or more additional reserved bits, or a combination thereof. In some examples, the FDRA may be a number of bits in the first stage SCI that may indicate a number of slots and a number of subchannels 250 reserved for the reserved resources 225 (e.g., a receiving UE 115 may determine a location of the reserved resources 225 based on the FDRA by using the subchannel 250 including the PSCCH 235 and first stage SCI as a reference), and the TDRA may be a number of bits in the first stage SCI (e.g., five bits, nine bits, or some other number of bits) that may indicate a number of time resources allocated as the reserved resources 225. As such, the first stage SCI may indicate the reserved resources 225 to the one or more sidelink UEs 115 in the network.

The sidelink UEs 115 may attempt to decode the reserved resources 225 indicated by the first stage SCI. In one example, the reserved resources 225 may be used for retransmission of sidelink data or the first stage SCI. Additionally or alternatively, the reserved resources 225 may include resources for sidelink transmissions, such as a PSSCH 230. The PSSCH 230 may be transmitted via one or more subchannels 250 and may include a number of symbols 255. In some examples, the PSSCH 230 may include the PSCCH 235 (e.g., the PSCCH 235 may be transmitted via one or more time or frequency resources via one or more full or partial symbols 255 of the PSSCH 230). A second stage SCI 240 may be transmitted via one or more symbols 255 of the PSSCH 230 (e.g., the SCI2 may be front-loaded and transmitted via one or more of the beginning symbols 255 of the PSSCH 230). The second stage SCI 240 may include an indication of which of the reserved resources 225 the transmitting UE 115 may use for sidelink transmissions, and the second stage SCI 240 may thereby be received and decoded by sidelink UEs 115 that are intended to receive and decode the corresponding sidelink communications. In some examples, the second stage SCI 240 may include one or more fields (e.g., bit fields) that may indicate one or more parameters for locating the resources that are to be used and decoding the PSSCH 230. For example, the second stage SCI 240 may include a HARQ ID, a HARQ enable or disable bit, a new data indicator (NDI), a redundancy version (RV) ID, a source ID, a destination ID, or some combination thereof.

To reduce interference during the transmission of the second stage SCI 240, the transmitting UE 115 may transmit the first stage SCI with a larger coverage area than the PSSCH 230 (e.g., the PSSCH 230 including the second stage SCI 240). For example, UE 115-*c* may transmit first stage SCI to UEs 115-*a*, 115-*b*, and one or more other sidelink UEs 115 in the SCI coverage area, but UE 115-*c* may transmit the PSSCH 230 and the corresponding second stage SCI 240 within a smaller coverage area (e.g., the second stage SCI 240 may be transmitted to intended receiving UEs 115, such as UEs 115-*a* and 115-*b*, but not to other UEs 115). As such, the area of throughput for the sidelink transmissions may be limited by the radius of the coverage area of the first stage SCI.

To improve throughput for sidelink transmissions, a sidelink UE 115 may decode a first stage SCI transmission from a transmitting UE 115, and the sidelink UE 115 may determine to reuse the reserved resources 225 indicated by the first stage SCI. For example, transmitting UE 115-*c* may transmit first stage SCI to UE 115-*b* and one or more other UEs 115 within the first stage SCI coverage area via the sidelink control resources 220 (e.g., the sidelink control resources 220 may be located within a PSCCH 235). However, in some cases, UE 115-*b* may refrain from decoding the second stage SCI 240 from UE 115-*c* (e.g., UE 115-*b* may be out of the coverage area of the second stage SCI 240, UE 115-*c* may not intend for UE 115-*b* to receive the corresponding sidelink communications, UE 115-*b* may be unable to decode the resources indicated by the first stage SCI, or some combination thereof), and UE 115-*b* may instead determine to use the indicated resources. Additionally or alternatively, UE 115-*b* may determine that transmitting UE 115-*c* is a safe distance from UE 115-*b*, and UE 115-*b* may determine to use the reserved resources 225. For example, UE 115-*b* may perform one or more distance measurements and pathloss measurements to determine an interference-free coverage area for reusing the indicated reserved resources 225.

In some examples, to determine an interference-free distance (e.g., an RF distance) to the boundary of the PSSCH coverage area for reusing the indicated resources, a sidelink UE 115 may determine a distance to a transmitting UE 115 (e.g., such as the distance 215 between UE 115-*b* and transmitting UE 115-*c*) and a radius of the PSSCH coverage area. The sidelink UE 115 may calculate the interference-free RF distance by subtracting the radius of the PSSCH coverage area from the distance to the transmitting UE 115. For example, UE 115-*b* may receive a first stage SCI from UE 115-*c*, and UE 115-*b* may attempt to measure an interference-free RF distance for reusing the resources indicated as reserved by the first stage SCI. UE 115-*b* may perform a power measurement to estimate the distance 215 to UE 115-*c*, and UE 115-*b* may determine the radius of the PSSCH coverage area based on information in the first stage SCI decoded by UE 115-*b* (e.g., UE 115-*b* may decode the first stage SCI and identify one or more of a MCS, beta offset, and a format of the PSSCH resources). As such, UE 115-*b* may determine an interference-free RF distance by subtracting the radius of the PSSCH coverage area from the distance 215 to UE 115-*c*. UE 115-*b* may thereby reuse the resources indicated by the first stage SCI within a coverage area with a radius no greater than the determined RF distance.

A sidelink UE 115 may thereby receive a first stage SCI from a transmitting UE 115 that may identify a set of reserved resources, and the sidelink UE 115 may determine to reuse the resources to improve the throughput for sidelink communications. The UE 115 may determine a coverage area for reusing the resources without interfering with existing sidelink transmissions.

Figure 3:
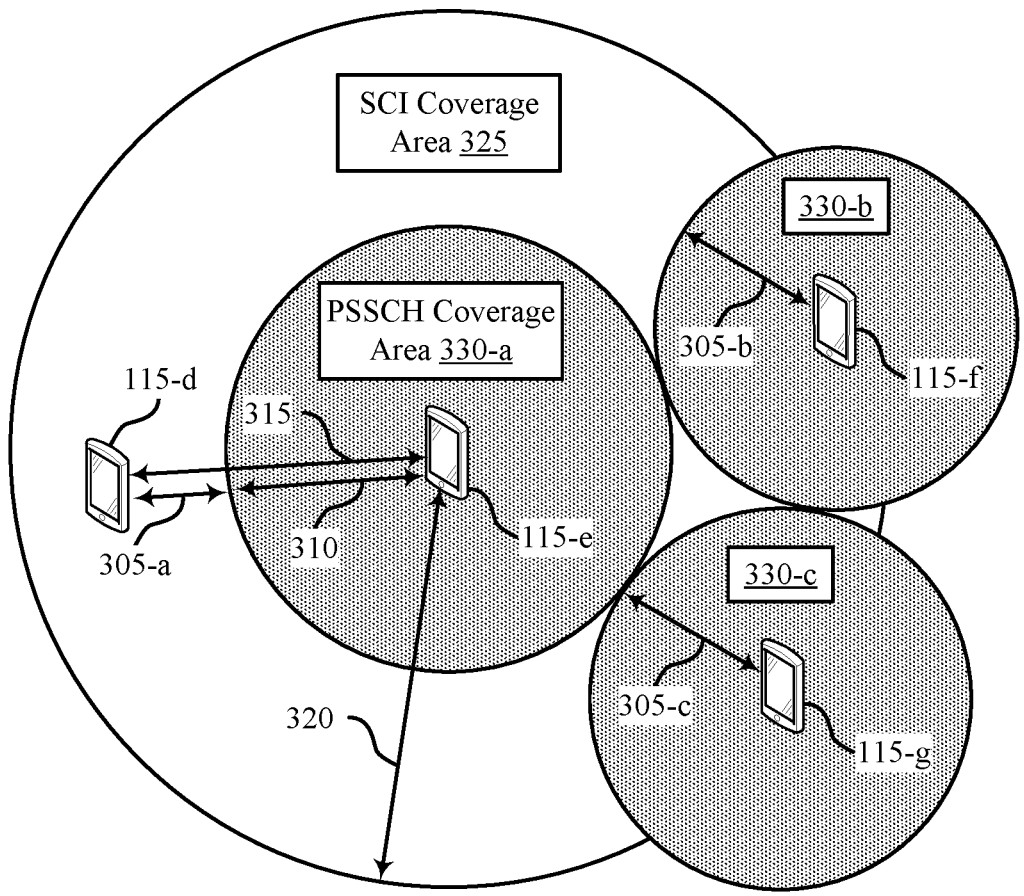
FIG. 3 illustrates an example of a coverage area diagram that supports spatial reuse for sidelink communications in accordance with aspects of the present disclosure.

FIG. 3 illustrates an example of a coverage area diagram 300 in accordance with various aspects of the present disclosure. The coverage area diagram 300 may include UEs 115-*d*, 115-*e*, 115-*f*, and 115-*g*, which may be examples of UEs 115 as described with reference to FIGS. 1 and 2. The coverage area diagram 300 may include SCI coverage area 325 and PSSCH coverage areas 330 (e.g., PSSCH coverage areas 330-*a*, 330-*b*, and 330-*c*). The SCI coverage area 325 may illustrate the coverage area of a first stage SCI transmission, and the PSSCH coverage areas 330 may illustrate the coverage area of respective PSSCH transmissions, which may include second stage SCI (e.g., the second stage SCI may be transmitted via a control channel within the PSSCH), as described with reference to FIG. 2. In some examples, the UEs 115 may determine to reuse one or more resources indicated by the first stage SCI. For example, the UEs 115 may determine RF distances 305 (e.g., RF distances 305-*a*, 305-*b*, and 305-*c*) for reusing the indicated resources with reduced interference.

In some examples, the coverage area of the first stage SCI may be configured by the network. For example, the network may configure UE 115-*e* to transmit first stage SCI within the SCI coverage area 325 (e.g., UE 115-*e* may be configured to transmit first stage SCI with a configured transmit power, via configured transmit resources, or both, within the SCI coverage area 325). Each UE 115 within the SCI coverage area 325 may receive the first stage SCI including an indication of reserved resources for sidelink communications associated with UE 115-*e*. The reserved resources (e.g., PSSCH resources) may include second stage SCI, as described with reference to FIG. 2. In some examples, the SCI coverage area 325 may indicate the resource reservation to each UE 115 in the network (e.g., the SCI coverage area 325 may be large enough to reach each surrounding UE 115 and improve coverage and reliability within the network).

In some examples, the coverage of PSSCH and second stage SCI transmissions may be limited by the SCI radius 320 of the SCI coverage area 325. For example, the sidelink data and second stage SCI conveyed via PSSCH coverage area 330-*a* may be intended for a group of receiving UEs 115 (e.g., a group of UEs 115 receiving sidelink data via the resources indicated by the first stage SCI), rather than each UE 115 in the network, and PSSCH coverage area 330-*a* may be smaller than the SCI coverage area 325 accordingly. Additionally or alternatively, PSSCH coverage area 330-*a* may be smaller than the SCI coverage area 325 to reduce interference during the transmission of the second stage SCI. In some examples, a coverage area parameter may be configured for determining the PSSCH radius 310 (e.g., the coverage area parameter may be determined based on a path loss exponent, a signal to interference plus noise ratio (SINR) target, or the like). For example, the PSSCH radius 310 may be smaller than the SCI radius 320 by a factor of the coverage area parameter (e.g., the PSSCH radius 310 may be referred to as $R_2$, the SCI radius 320 may be referred to as $R_1$, the coverage area parameter may be referred to as $\alpha$, and $\alpha$ may be determined such that $R_1 \geq \alpha R_2$). In one example, (e.g., during free space omni-direction transmission), the coverage area parameter may be two and the PSSCH radius may be two times smaller than the SCI radius 320.

As described herein, the spatial reuse of resources may be improved if a UE 115 determines to reuse the resources indicated by the first stage SCI. For example, if UE 115-*f* receives and decodes a first stage SCI and a second stage SCI from UE 115-*e*, UE 115-*f* may receive sidelink transmissions via the reserved resources indicated by the first and second stage SCI. However, if UE 115-*f* is outside of PSSCH coverage area 330-*a* (e.g., UE 115-*f* is unable to receive or decode the second stage SCI), UE 115-*f* may improve the area of throughput for sidelink transmissions by determining an interference-free distance for reusing the resources indicated by the first stage SCI. UE 115-*f* may reuse the reserved resources if UE 115-*f* determines that the interference-free distance is greater than a threshold distance. The threshold distance may be determined based on an alpha factor, $\alpha$, which may correspond to a pathloss exponent, an SINR target, a spatial transmission type, or some combination thereof. The area of throughput for the sidelink transmission may be inversely proportional to the SCI radius (e.g., $AreaSE_{V2X} \sim 1/\pi(R_1^2)$), and if the reserved resources indicated by the first stage SCI are reused the area of throughput may be increased by the alpha factor squared (e.g., $AreaSE_{Proposal} \geq \alpha^2 AreaSE_{V2X}$). In one example, if the alpha factor is two, the area of throughput may be increased by more than four-fold.

A UE 115 may determine a coverage area for reusing the resources to avoid interfering with the existing SCI coverage are 325 and PSSCH coverage area 330-*a*. For example, UEs 115-*f* and 115-*g* may be located within the SCI coverage area 325, but outside of corresponding PSSCH coverage area 330-*a*. UEs 115-*f* and 115-*g* may thereby determine to reuse the reserved resources indicated by the first stage SCI within new PSSCH coverage areas 330-*b* and 330-*c*, respectively (e.g., PSSCH coverage areas 330-*b* and 330-*c* may be examples of the respective UEs 115 determining new PSSCH transmit resources and new transmit powers for reusing the resources). The radius of PSSCH coverage area 330-*b* may be different from the PSSCH radius 310. Additionally or alternatively, the radius of PSSCH coverage area 330-*b* may be the same as or different from the radius of PSSCH coverage area 330-*c*. For example, the radius of each new PSSCH coverage area 330 may be determined by an RF distance 305 to the boundary of PSSCH coverage area 330-*a* (e.g., an interference-free distance), and each RF distance 305 may be determined by a respective UE 115 for reusing the reserved resources with reduced interference.

In some examples, to determine an RF distance 305, a sidelink UE 115 may determine a distance to the transmitting UE 115 (e.g., the UE 115 transmitting the first stage SCI, such as UE 115-e) and a radius of the corresponding PSSCH coverage area 330. The interference-free RF distance 305 may be determined by subtracting the radius of the PSSCH coverage area 330 from the distance to the transmitting UE 115. For example, UE 115-d may be within SCI coverage area 325 and out of PSSCH coverage area 330-a, and UE 115-d may determine RF distance 305-a for reusing the resources indicated by the first stage SCI. In some examples, UE 115-d may perform a power measurement to estimate the distance 315 to transmitting UE 115-e. For example, UE 115-d may use DMRSs decoded from the first stage SCI (e.g., or the second stage SCI in some examples) to estimate the pathloss to transmitting UE 115-e (e.g., a loss of RSRP, such as $PL_{RSRP}$, or a reference signal strength indicator (RSSI) measurement). UE 115-d may determine the distance 315 to transmitting UE 115-e according to the pathloss estimate. In some examples, the distance 315 to transmitting UE 115-e may be referred to as D. UE 115-d may determine the PSSCH radius 310 based on information in the first stage SCI decoded by UE 115-d. For example, UE 115-d may decode the first stage and identify one or more of an MCS, a beta offset for the second stage SCI, and a format of the PSSCH resources that may indicate the PSSCH radius 310. The PSSCH radius 310 and each of the corresponding parameters in the first stage SCI may be configured by the network (e.g., as one example, the PSSCH radius 310 may be 10 meters if the beta offset is one, or the like). In some examples, the PSSCH radius 310 may be referred to as $R_2$. UE 115-d may determine RF distance 305-a by subtracting the PSSCH radius 310 from the distance 315 to UE 115-e (e.g., RF distance 305-a, which may be referred to as $d_2$, may be determined by $d_2=D-R_2$). UE 115-d may thereby reuse the resources indicated by the first stage SCI within a new PSSCH coverage area 330 with a radius no greater than determined RF distance 305-a (e.g., a radius less than or equal to $d_2$). In some examples, the RF distance 305 may be an interference-free distance, or may be associated with interference that is less than a threshold.

UE 115-d may determine the new PSSCH coverage area 330 based on the RF distance, the resources indicated by the first stage SCI, a new PSSCH coverage area 330 determined by another UE 115, or some combination thereof. For example, UE 115-d may receive one or more first stage SCI transmissions, and each first stage SCI may indicate a respective set of reserved resources for sidelink communications. UE 115-d may determine to reuse any combination of the resources indicated by the first stage SCI transmissions (e.g., UE 115-d may receive 10 or some other number of first stage SCI transmissions, and UE 115-d may reuse a combination of the subchannels indicated by each of the first stage SCI transmissions). Additionally or alternatively, UE 115-d may determine to reuse one or more resources indicated by the first stage SCI and one or more unoccupied resources (e.g., unoccupied resources with a similar permitted transmit power). In another example, if one or more UEs 115 reserve the same subchannel, UE 115-d may receive a first stage SCI transmission from each of the UEs 115, and UE 115-d may determine to reuse resources within a PSSCH coverage area 330 with a radius less than or equal to the smallest RF distance 305 of the RF distances 305 indicated by the first stage SCI transmissions.

As described herein, a sidelink UE 115 may receive a first stage SCI and determine to reuse the reserved sidelink resources indicated by the first stage SCI to improve the area of throughput for receiving sidelink transmissions. The UE 115 may thereby reduce latency associated with the sidelink communications and use fewer resources for receiving sidelink transmissions.

Figure 4:
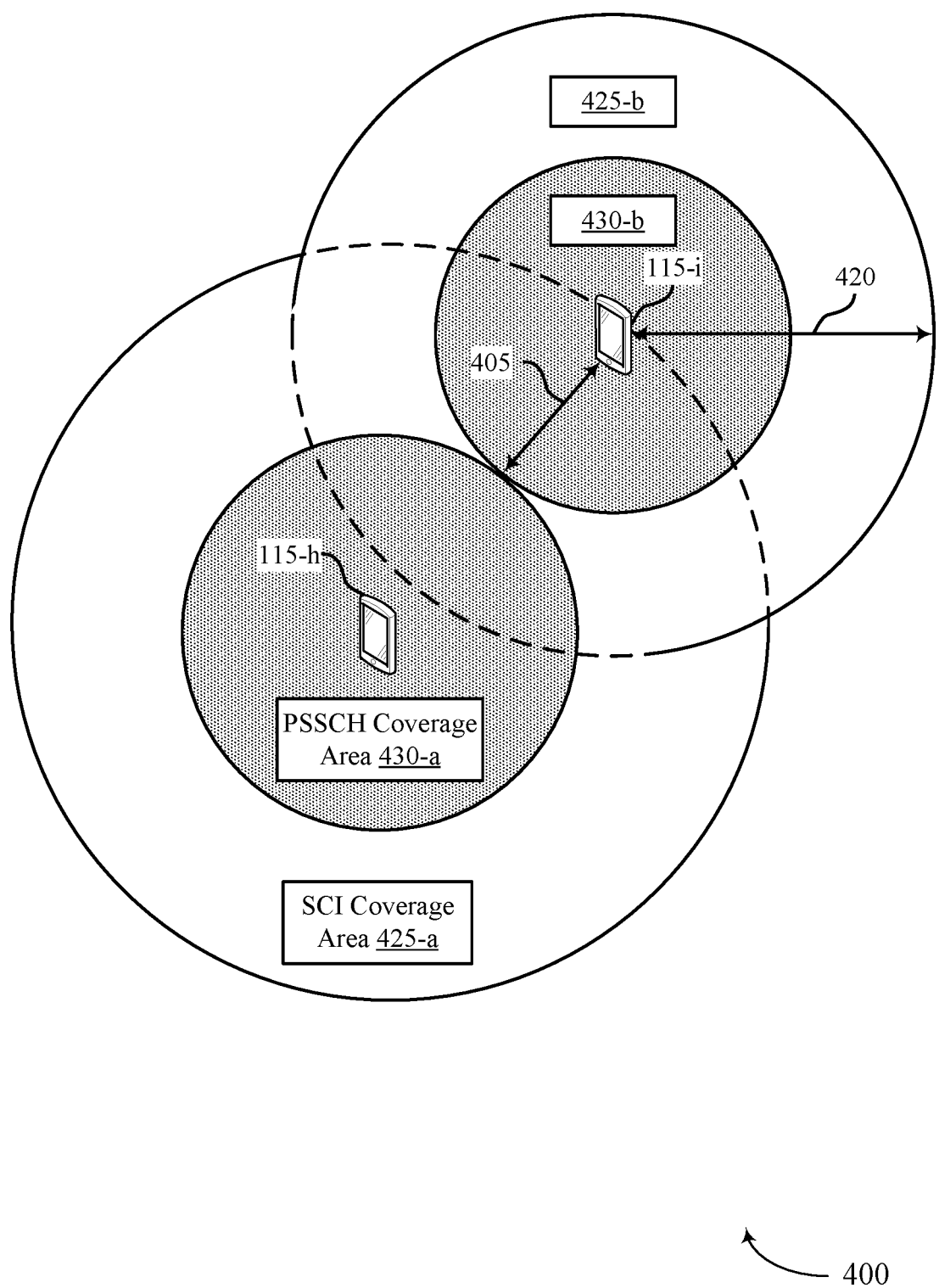
FIG. 4 illustrates an example of a coverage area diagram that supports spatial reuse for sidelink communications in accordance with aspects of the present disclosure.

FIG. 4 illustrates an example of a coverage area diagram 400 in accordance with various aspects of the present disclosure. The coverage area diagram 400 may include UEs 115-h and 115-i, which may be examples of UEs 115 as described with reference to FIGS. 1-3. The coverage area diagram 400 may include SCI coverage areas 425 (e.g., SCI coverage areas 425-a and 425-b) and PSSCH coverage areas 430 (e.g., PSSCH coverage areas 430-a and 430-b), which may be examples of SCI coverage areas 325 and PSSCH coverage areas 330 as described with reference to FIG. 3. In some examples, UE 115-i may determine to reuse one or more resources indicated by the first stage SCI transmitted by UE 115-h. UE 115-i may broadcast a new first stage SCI within SCI coverage area 425-b to inform other receiving UEs 115 of the location of the new PSSCH resources and that the resources are occupied. UE 115-i may utilize one or more methods for reducing interference between original SCI coverage area 425-a and new SCI coverage area 425-b.

In the example of FIG. 4, UE 115-i may receive and decode the first stage SCI from UE 115-h within SCI coverage area 425-a, but UE 115-i may be unable to receive and decode the corresponding second stage SCI transmitted within PSSCH coverage area 430-a. UE 115-i may instead measure the RF distance 405 and determine to reuse the resources indicated by the first stage SCI within new PSSCH coverage area 430-b without interfering with PSSCH coverage area 430-a, as described with reference to FIGS. 2 and 3. UE 115-i may transmit a new first stage SCI transmission to inform receiving UEs 115 where to receive and decode the sidelink transmission, and to indicate to other UEs 115 that the resources are being reused within PSSCH coverage area 430-b (e.g., UE 115-i may broadcast the first stage SCI to each UE 115 in SCI coverage area 425-b). However, in some examples, new SCI coverage area 425-b may interfere (e.g., overlap, as shown in FIG. 4) with the original SCI coverage area 425-a, the original PSSCH coverage area 430-a, or both. For example, the new SCI coverage area 425-b may include an SCI radius 420 that may overlap with the original SCI coverage area 425-a.

UE 115-i may utilize one or more methods for reducing interference between the new first stage SCI transmission and the existing first stage SCI transmission. In some examples, the PSCCH including the first stage SCI may be transmitted via a subchannel that may have the lowest index within a data channel (e.g., in one example if the data channel includes subchannel indices 0 through 5, the PSCCH may be transmitted via subchannel 0). In a first method for reducing the interference between SCI transmissions, UE 115-i may receive the original first stage SCI transmission from UE 115-h via a first subchannel, and UE 115-i may refrain from reusing the first subchannel (e.g., the existing subchannel may not be reused). Additionally or alternatively, the position of the first stage SCI may be relaxed such that UE 115-i may transmit the new first stage SCI in a different subchannel from the original first stage SCI transmission. For example, if the first stage SCI transmitted by UE 115-h was transmitted via a first subchannel position within the data channel, UE 115-i may identify another subchannel position for transmitting the new SCI (e.g., via a subchannel with a subchannel index larger than 0). UE 115-i may transmit an indication of the location of the first stage SCI to receiving UEs 115 (e.g., via a field in the first stage SCI or second stage SCI).

In some examples, the new first stage SCI transmission may include the same information (e.g., the same priority, DMRS pattern, and SCI2 format) as the original first stage SCI transmission. In such examples, UE 115-*i* may transmit the new first stage SCI via the same subchannel as the original first stage SCI. However, if the new first stage SCI is the same as the original first stage SCI, the format of the second stage SCI may be the same (e.g., the first stage SCI may indicate that new PSSCH coverage area 430-*b* is the same as existing PSSCH coverage area 430-*a*). In such cases, to avoid interfering with the existing PSSCH and second stage SCI transmissions while reusing the resources, UE 115-*i* may determine a separate transmit power for the new second stage SCI to reduce interference with the existing second stage SCI transmissions (e.g., the transmit power for the second stage SCI may be different from the second stage SCI format indicated via the first stage SCI). The UE 115-*i* may determine the transmit power based on the RF distance 405, based on an unsuccessful decoding of the second stage SCI, or both. In one example, UE 115-*i* may indicate the transmit power control to receiving UEs 115 via a beta offset value.

By utilizing one of the described methods for reducing interference, UE 115-*i* may transmit (e.g., broadcast) a new first stage SCI transmission within new SCI coverage area 425-*b* with a new transmit power, using new transmit resources, a new subchannel, or some combination thereof, without interfering with the existing first stage SCI transmitted via SCI coverage are 425-*a* or the existing second stage SCI transmitted via PSSCH coverage area 430-*a*. As such, UE 115-*i* may improve the spatial reuse of sidelink resources and increase the area of throughput for a sidelink data transmission.

Figure 5:
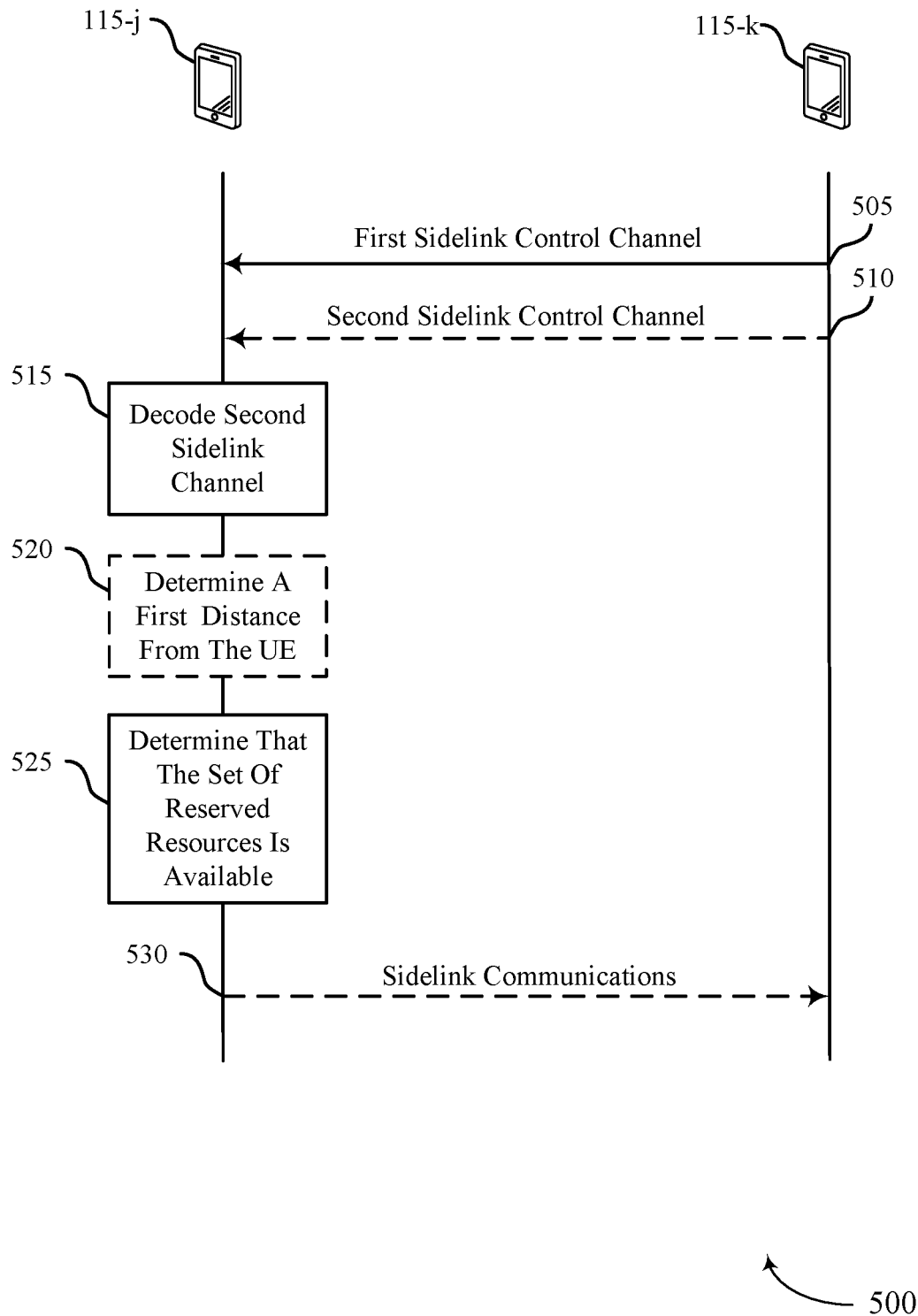
FIG. 5 illustrates an example of a process flow that supports spatial reuse for sidelink communications in accordance with aspects of the present disclosure.

FIG. 5 illustrates an example of a process flow 500 in accordance with various aspects of the present disclosure. In some examples, process flow 500 may implement aspects of wireless communications systems 100 or 200, or coverage area diagrams 300 or 400. Process flow 500 illustrates communications between a UE 115-*j* and a UE 115-*k*, which may be examples of UEs 115 as described with reference to FIG. 1. It is understood that the devices and nodes described by the process flow 500 may communicate with or be coupled with other devices or nodes that are not illustrated. For instance, UEs 115-*j* and 115-*k* may communicate with one or more other UEs 115. Alternative examples of the following may be implemented, where some steps are performed in a different order than described or are not performed at all. In some cases, a step may include additional features not mentioned below, or further steps may be added.

At 505, UE 115-*j* may receive a first sidelink control channel from UE 115-*k*. The first sidelink control channel may include a first stage SCI, and may indicate a set of reserved resources for sidelink communications associated with UE 115-*k*.

At 510, in some examples, UE 115-*j* may receive a second sidelink control channel from UE 115-*k*. The second sidelink control channel may include a second stage SCI. In some cases, the second stage SCI may indicate which of the reserved resources indicated by the first stage SCI UE 115-*k* may use for sidelink communications.

At 515, UE 115-*j* may decode the second sidelink control channel from UE 115-*k* based on the first sidelink control channel received at 505. In one example, UE 115-*j* may attempt to decode the second sidelink control channel to receive sidelink transmissions from UE 115-*k*.

At 520, in some examples, UE 115-*j* may determine a first distance from UE 115-*j*. The first distance may correspond to a difference between a radius of the second sidelink control channel and a distance between UE 115-*j* and UE 115-*k*. In some examples, the first distance may be referred to as an interference-free distance. The interference-free distance may be determined based on a result of the decoding procedure of the second sidelink control channel.

At 525, UE 115-*j* may determine that the set of reserved resources indicated by the first sidelink control channel is available. UE 115-*j* may determine that the set of reserved resources is available based on the decoding of the second sidelink control channel, the radius of the second sidelink control channel, and the distance between UE 115-*j* and UE 115-*k*. In some examples, UE 115-*j* may determine that the set of reserved resources may be reused by UE 115-*j* within the first distance corresponding to the difference between the distance between UE 115-*j* and UE 115-*k* and the radius of the second sidelink control channel.

At 530, in some examples, UE 115-*j* may communicate with UE 115-*k* via the set of reserved resources. UE 115-*j* may communicate with UE 115-*k* via the set of reserved resources based on the determination at 525 that the set of reserved resources is available for use by UE 115-*j*.

Figure 6:
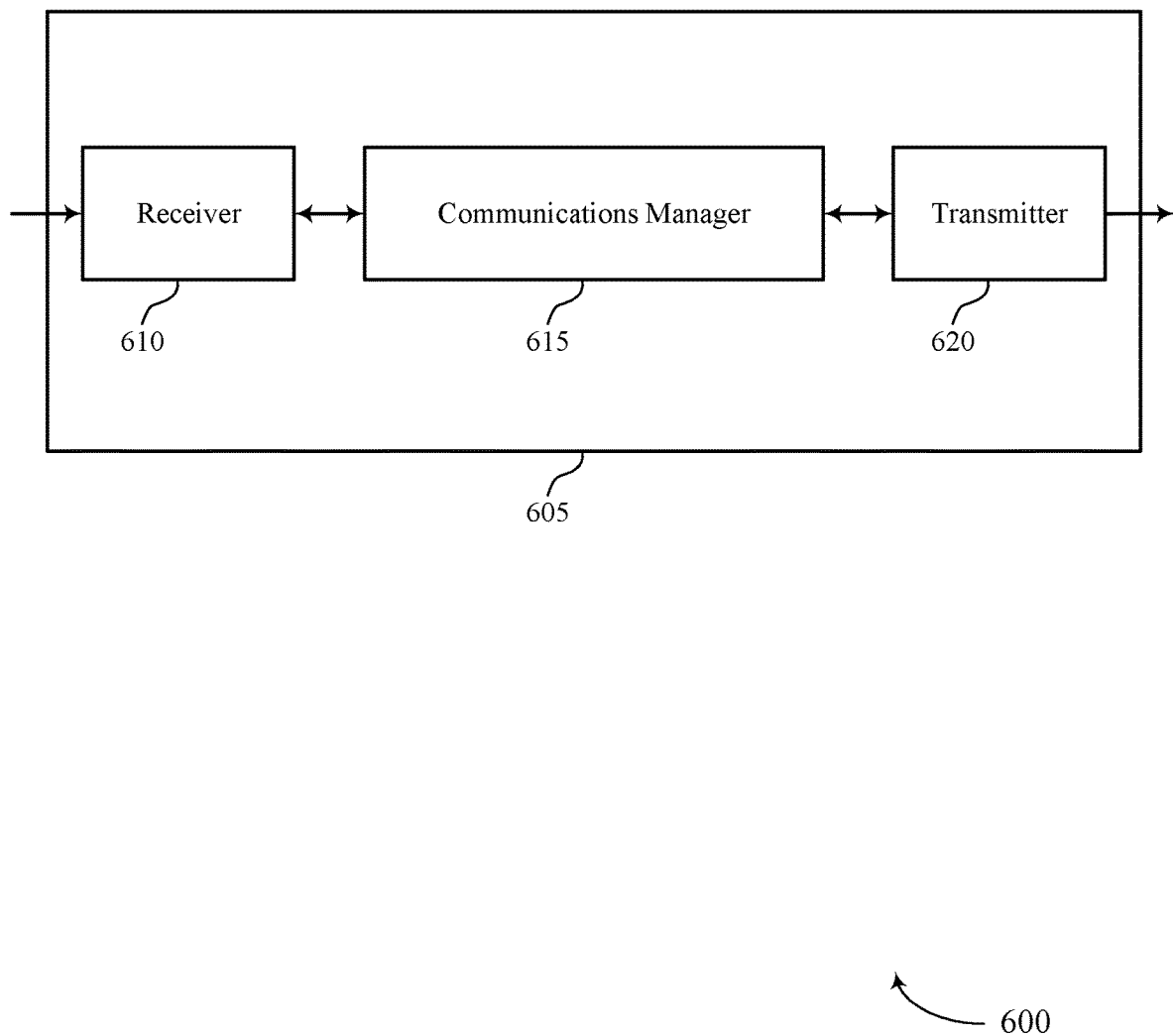
FIGS. 6 and 7 show block diagrams of devices that support spatial reuse for sidelink communications in accordance with aspects of the present disclosure.

FIG. 6 shows a block diagram 600 of a device 605 that supports spatial reuse for sidelink communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to spatial reuse for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a second UE, a first sidelink control channel indicating a set of reserved resources for sidelink communications associated with the second UE, decode a second sidelink control channel from the second UE based on the first sidelink control channel, and determine that the set of reserved resources is available for use by the first UE based on the decoding of the second sidelink control channel, a radius of the second sidelink control channel, and a distance between the first UE and the second UE. The communications manager 615 may also receive, from a second UE, a first sidelink control channel indicating a set of reserved resources for sidelink communications associated with the second UE, monitor for a second sidelink control channel from the second UE based on the first sidelink control channel, and determine that the set of reserved resources is available for use by the first UE based on the monitoring of the second sidelink control channel, where the set of reserved resources is determined to be available based on an unsuccessful decoding of the second sidelink control channel. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to improve the throughput for a sidelink transmission by reusing resources reserved for sidelink communications. For example, the device 605 (e.g., a sidelink UE 115) may receive a first stage SCI transmission, and the device 605 may determine to reuse the reserved resources indicated by the first stage SCI. In some examples, the device 605 may determine an RF distance to the boundary of the existing sidelink data and SCI transmissions, and the device 605 may reuse the resources within a coverage area with a radius less than or equal to the RF distance. As such, the device 605 may reduce interference with existing sidelink transmissions and the device 605 may increase the area of throughput for receiving sidelink transmissions.

Additionally or alternatively, the device 605 may utilize unused resources. For example, some resources indicated by the first stage SCI may be associated with a low probability of utilization, and the device 605 may determine to reuse the resources. One implementation may allow for the device 605 to reuse resources which may otherwise be wasted, and the device 605 may receive a sidelink transmission using fewer resources. As such, the device 605 may reduce latency associated with communications, and may thereby improve user experience.

Figure 7:
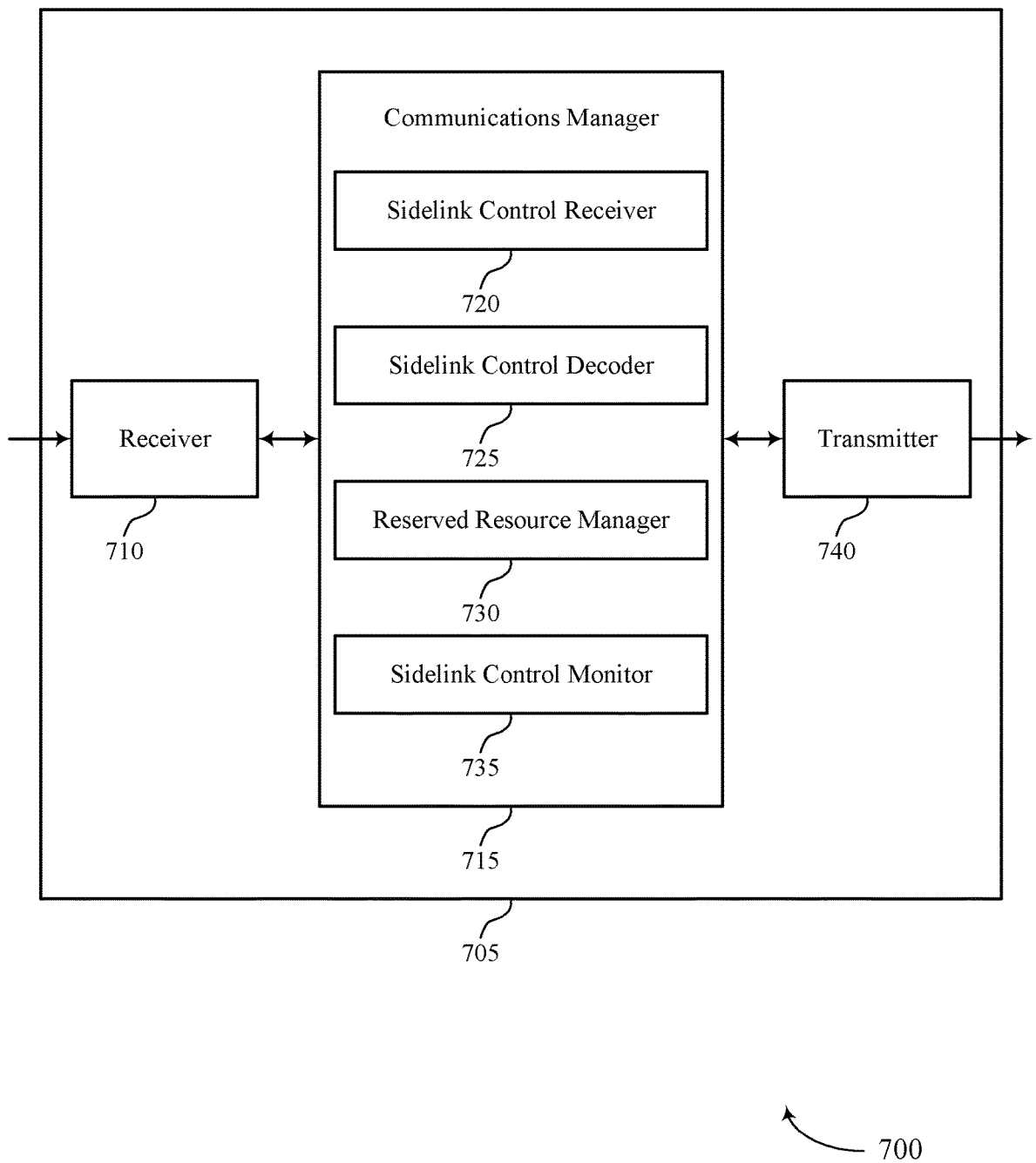

FIG. 7 shows a block diagram 700 of a device 705 that supports spatial reuse for sidelink communications in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to spatial reuse for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink control receiver 720, a sidelink control decoder 725, a reserved resource manager 730, and a sidelink control monitor 735. The communications manager 715 may be an example of aspects of the communications manager 910 described herein.

The sidelink control receiver 720 may receive, from a second UE, a first sidelink control channel indicating a set of reserved resources for sidelink communications associated with the second UE.

The sidelink control decoder 725 may decode a second sidelink control channel from the second UE based on the first sidelink control channel.

The reserved resource manager 730 may determine that the set of reserved resources is available for use by the first UE based on the decoding of the second sidelink control channel, a radius of the second sidelink control channel, and a distance between the first UE and the second UE.

The sidelink control receiver 720 may receive, from a second UE, a first sidelink control channel indicating a set of reserved resources for sidelink communications associated with the second UE.

The sidelink control monitor 735 may monitor for a second sidelink control channel from the second UE based on the first sidelink control channel.

The reserved resource manager 730 may determine that the set of reserved resources is available for use by the first UE based on the monitoring of the second sidelink control channel, where the set of reserved resources is determined to be available based on an unsuccessful decoding of the second sidelink control channel.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
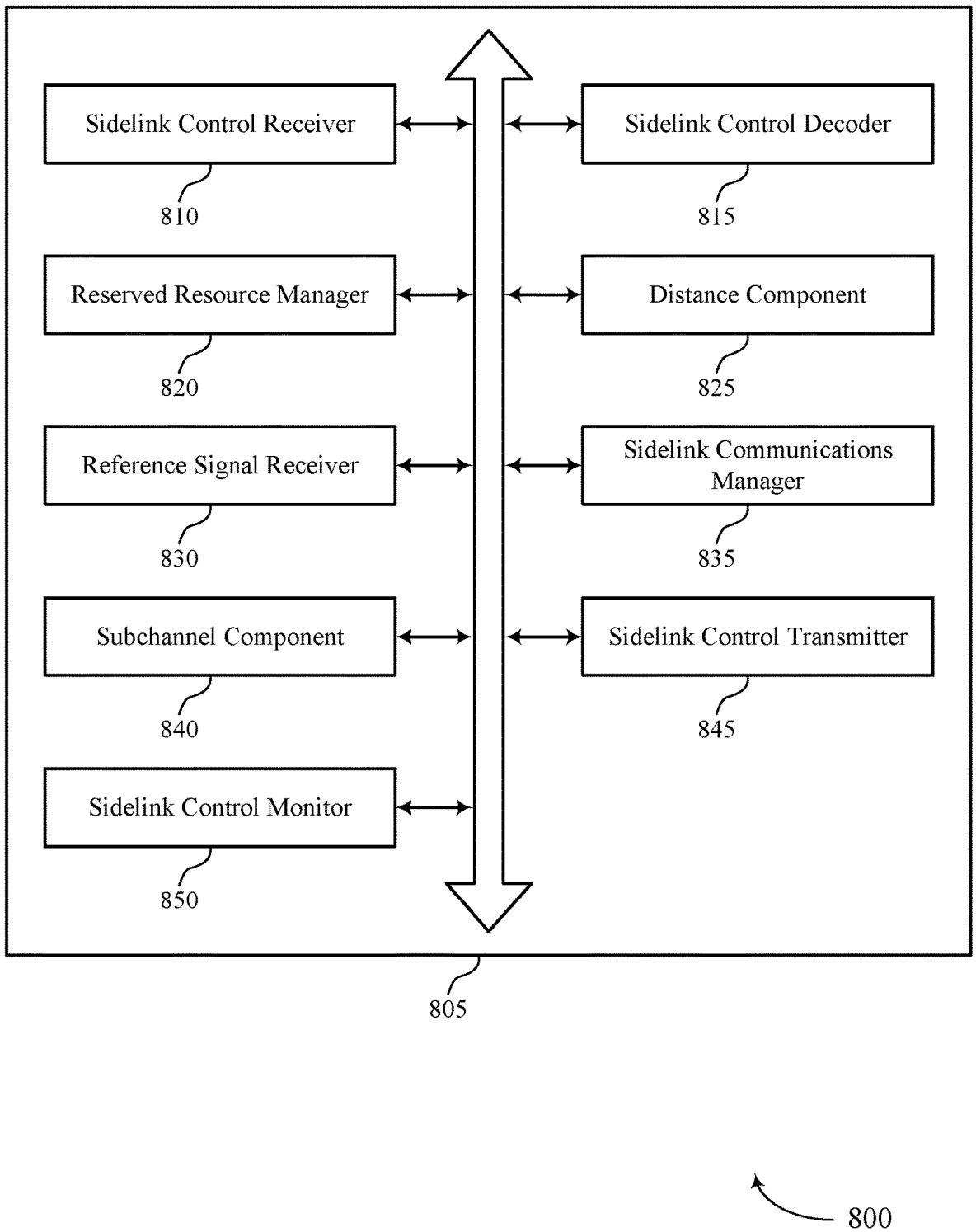
FIG. 8 shows a block diagram of a communications manager that supports spatial reuse for sidelink communications in accordance with aspects of the present disclosure.

FIG. 8 shows a block diagram 800 of a communications manager 805 that supports spatial reuse for sidelink communications in accordance with aspects of the present disclosure. The communications manager 805 may be an example of aspects of a communications manager 615, a communications manager 715, or a communications manager 910 described herein. The communications manager 805 may include a sidelink control receiver 810, a sidelink control decoder 815, a reserved resource manager 820, a distance component 825, a reference signal receiver 830, a sidelink communications manager 835, a subchannel component 840, a sidelink control transmitter 845, and a sidelink control monitor 850. Each of these modules may communicate, directly or indirectly, with one another (e.g., via one or more buses).

The sidelink control receiver 810 may receive, from a second UE, a first sidelink control channel indicating a set of reserved resources for sidelink communications associated with the second UE.

In some examples, the sidelink control receiver 810 may receive, from a second UE, a first sidelink control channel indicating a set of reserved resources for sidelink communications associated with the second UE.

In some examples, the sidelink control receiver 810 may receive one or more additional sidelink control channels, each additional sidelink control channel indicating a respective set of reserved resources for sidelink communications.

In some examples, the sidelink control receiver 810 may receive an indication of a subchannel index of the first sidelink control channel within a field of the first sidelink control channel.

In some examples, the sidelink control receiver 810 may receive one or more additional sidelink control channels, each additional sidelink control channel indicating a respective set of reserved resources for sidelink communications.

In some examples, the sidelink control receiver 810 may receive an indication of a subchannel index of the first sidelink control channel within a field of the first sidelink control channel.

The sidelink control decoder 815 may decode a second sidelink control channel from the second UE based on the first sidelink control channel.

In some examples, the sidelink control decoder 815 may determine that the decoding of the second sidelink control channel is successful.

In some examples, the sidelink control decoder 815 may identify an MCS, a beta offset, a control format, or any combination thereof associated with the second sidelink control channel based on the decoding of the first sidelink control channel.

The reserved resource manager 820 may determine that the set of reserved resources is available for use by the first UE based on the decoding of the second sidelink control channel, a radius of the second sidelink control channel, and a distance between the first UE and the second UE.

In some examples, the reserved resource manager 820 may determine that the set of reserved resources is available for use by the first UE based on the monitoring of the second sidelink control channel, where the set of reserved resources is determined to be available based on an unsuccessful decoding of the second sidelink control channel.

In some examples, the reserved resource manager 820 may determine a subset of reserved resources that are available for use by the first UE, the subset of reserved resources being from the respective sets of reserved resources and the set of reserved resources.

In some examples, the reserved resource manager 820 may determine the subset of reserved resources based on respective transmit powers for the one or more additional sidelink control channels.

In some examples, the reserved resource manager 820 may determine the subset of reserved resources based on the respective distances associated with the one or more additional sidelink control channels.

In some examples, the reserved resource manager 820 may determine a subset of reserved resources that are available for use by the first UE, the subset of reserved resources being from the respective sets of reserved resources and the set of reserved resources.

In some examples, the reserved resource manager 820 may determine the subset of reserved resources based on respective transmit powers for the one or more additional sidelink control channels.

The sidelink control monitor 850 may monitor for a second sidelink control channel from the second UE based on the first sidelink control channel.

The distance component 825 may determine the radius of the second sidelink control channel based on determining that the decoding of the second sidelink control channel is successful, where the set of reserved resources are determined to be available based on a first distance corresponding to a difference between the distance between the first UE and the second UE and the radius of the second sidelink control channel exceeding a threshold distance.

In some examples, the distance component 825 may determine the threshold distance based on a second distance between the second UE and a target UE associated with the first sidelink control channel and a pathloss between the first UE and the second UE.

In some examples, the distance component 825 may determine the second distance between the second UE and the target UE based on the MCS, the beta offset, the control format, or any combination thereof associated with the second sidelink control channel.

In some examples, the distance component 825 may determine the threshold distance based on an alpha factor corresponding to a pathloss exponent, a SINR target, a spatial transmission type, or any combination thereof.

In some examples, the distance component 825 may determine respective distances for the one or more additional sidelink control channels based on respective successful decoding procedures for the one or more additional sidelink control channels.

The reference signal receiver 830 may receive a reference signal with the first sidelink control channel, the second sidelink control channel, or a sidelink data channel, or any combination thereof, where the pathloss between the first UE and the second UE is determined based on a power measurement associated with the reference signal.

In some cases, the power measurement is an RSRP, an RSSI, or a combination thereof.

The sidelink communications manager 835 may communicate with a target UE using the subset of reserved resources.

In some examples, the sidelink communications manager 835 may communicate with a target UE via the set of reserved resources based on determining that the set of reserved resources is available for use by the first UE.

In some examples, the sidelink communications manager 835 may determine a transmit power for communicating with a target UE using the set of reserved resources based on the radius of the second sidelink control channel and the distance between the first UE and the second UE. In some examples, the sidelink communications manager 835 may determine a transmit power for communicating with a target UE using the subset of reserved resources based on the unsuccessful decoding of the second sidelink control channel.

The subchannel component 840 may select a subchannel from a set of subchannels for sidelink communications with a target UE via the set of reserved resources, where the subchannel is different from a subchannel used for the first sidelink control channel.

In some examples, the subchannel component 840 may select a subchannel from a set of subchannels for sidelink communications with a target UE via the set of reserved resources, where the subchannel is associated with an index different from the subchannel index.

In some examples, the subchannel component 840 may determine a subchannel associated with the first sidelink control channel.

The sidelink control transmitter 845 may transmit a third sidelink control channel indicating the set of reserved resources available for use by the first UE using the subchannel based on a priority, a DMRS pattern, and a subsequent control channel format being the same for the third sidelink control channel and a subsequent control channel.

In some examples, the sidelink control transmitter 845 may transmit a third sidelink control channel indicating the set of reserved resources available for use by the first UE using the subchannel based on a priority, a DMRS pattern, and a subsequent control channel format being the same for the third sidelink control channel and a subsequent control channel.

Figure 9:
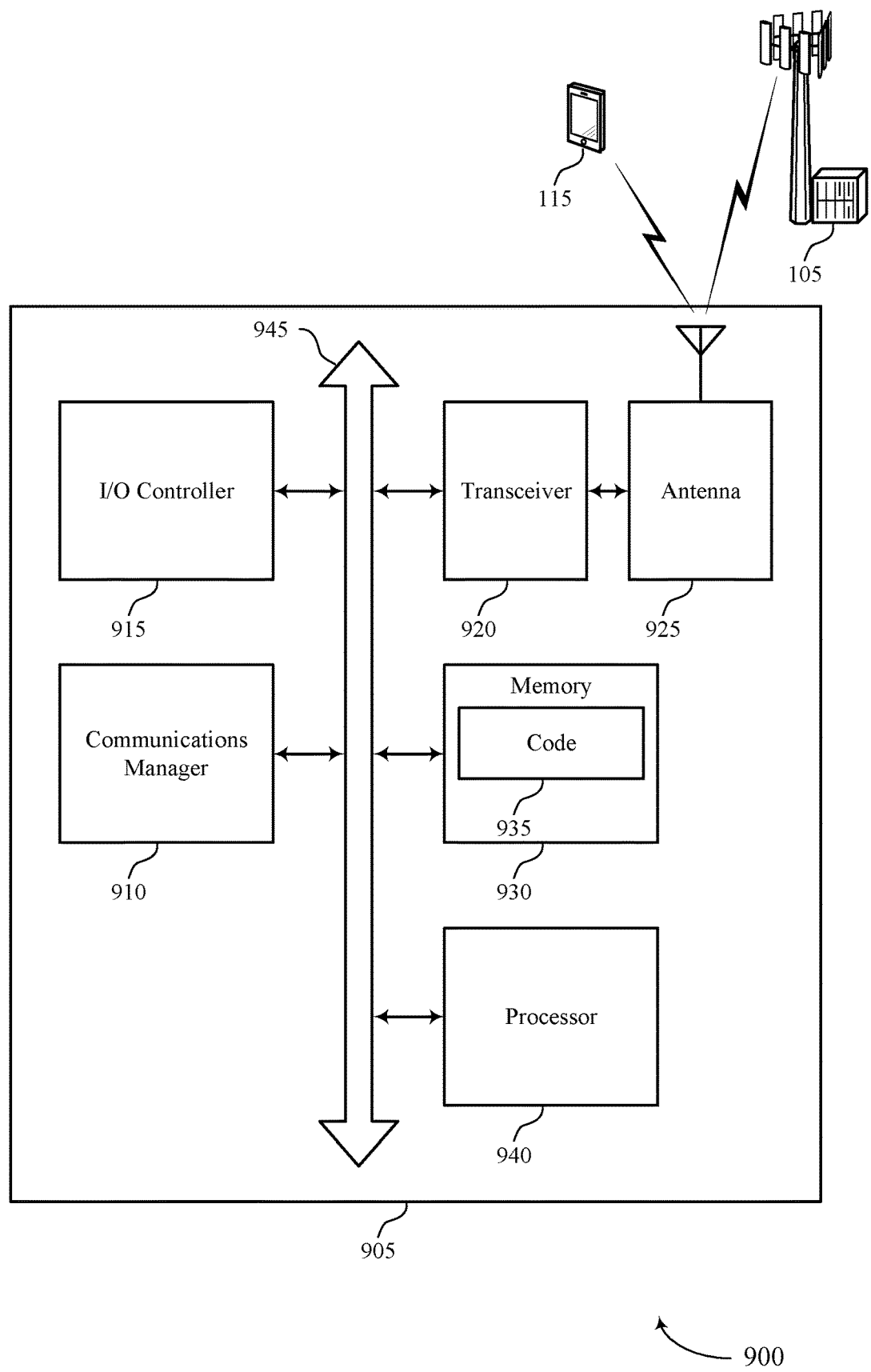
FIG. 9 shows a diagram of a system including a device that supports spatial reuse for sidelink communications in accordance with aspects of the present disclosure.

FIG. 9 shows a diagram of a system 900 including a device 905 that supports spatial reuse for sidelink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a second UE, a first sidelink control channel indicating a set of reserved resources for sidelink communications associated with the second UE, decode a second sidelink control channel from the second UE based on the first sidelink control channel, and determine that the set of reserved resources is available for use by the first UE based on the decoding of the second sidelink control channel, a radius of the second sidelink control channel, and a distance between the first UE and the second UE. The communications manager 910 may also receive, from a second UE, a first sidelink control channel indicating a set of reserved resources for sidelink communications associated with the second UE, monitor for a second sidelink control channel from the second UE based on the first sidelink control channel, and determine that the set of reserved resources is available for use by the first UE based on the monitoring of the second sidelink control channel, where the set of reserved resources is determined to be available based on an unsuccessful decoding of the second sidelink control channel.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases, the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting spatial reuse for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
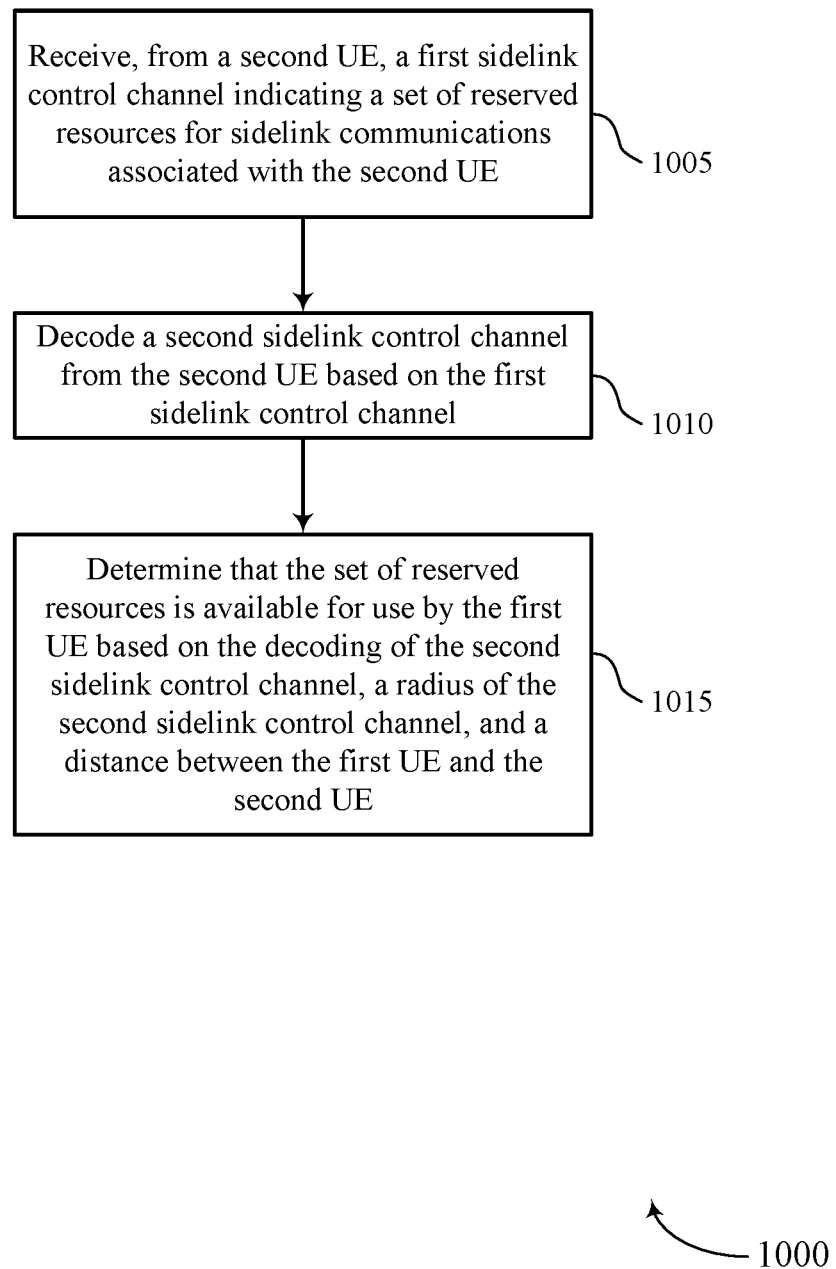
FIGS. 10 through 16 show flowcharts illustrating methods that support spatial reuse for sidelink communications in accordance with aspects of the present disclosure.

FIG. 10 shows a flowchart illustrating a method 1000 that supports spatial reuse for sidelink communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive, from a second UE, a first sidelink control channel indicating a set of reserved resources for sidelink communications associated with the second UE. The operations of 1005 may be performed according to the methods described herein. In some examples, aspects of the operations of 1005 may be performed by a sidelink control receiver as described with reference to FIGS. 6 through 9.

At 1010, the UE may decode a second sidelink control channel from the second UE based on the first sidelink control channel. The operations of 1010 may be performed according to the methods described herein. In some examples, aspects of the operations of 1010 may be performed by a sidelink control decoder as described with reference to FIGS. 6 through 9.

At 1015, the UE may determine that the set of reserved resources is available for use by the first UE based on the decoding of the second sidelink control channel, a radius of the second sidelink control channel, and a distance between the first UE and the second UE. The operations of 1015 may be performed according to the methods described herein. In some examples, aspects of the operations of 1015 may be performed by a reserved resource manager as described with reference to FIGS. 6 through 9.

Figure 11:
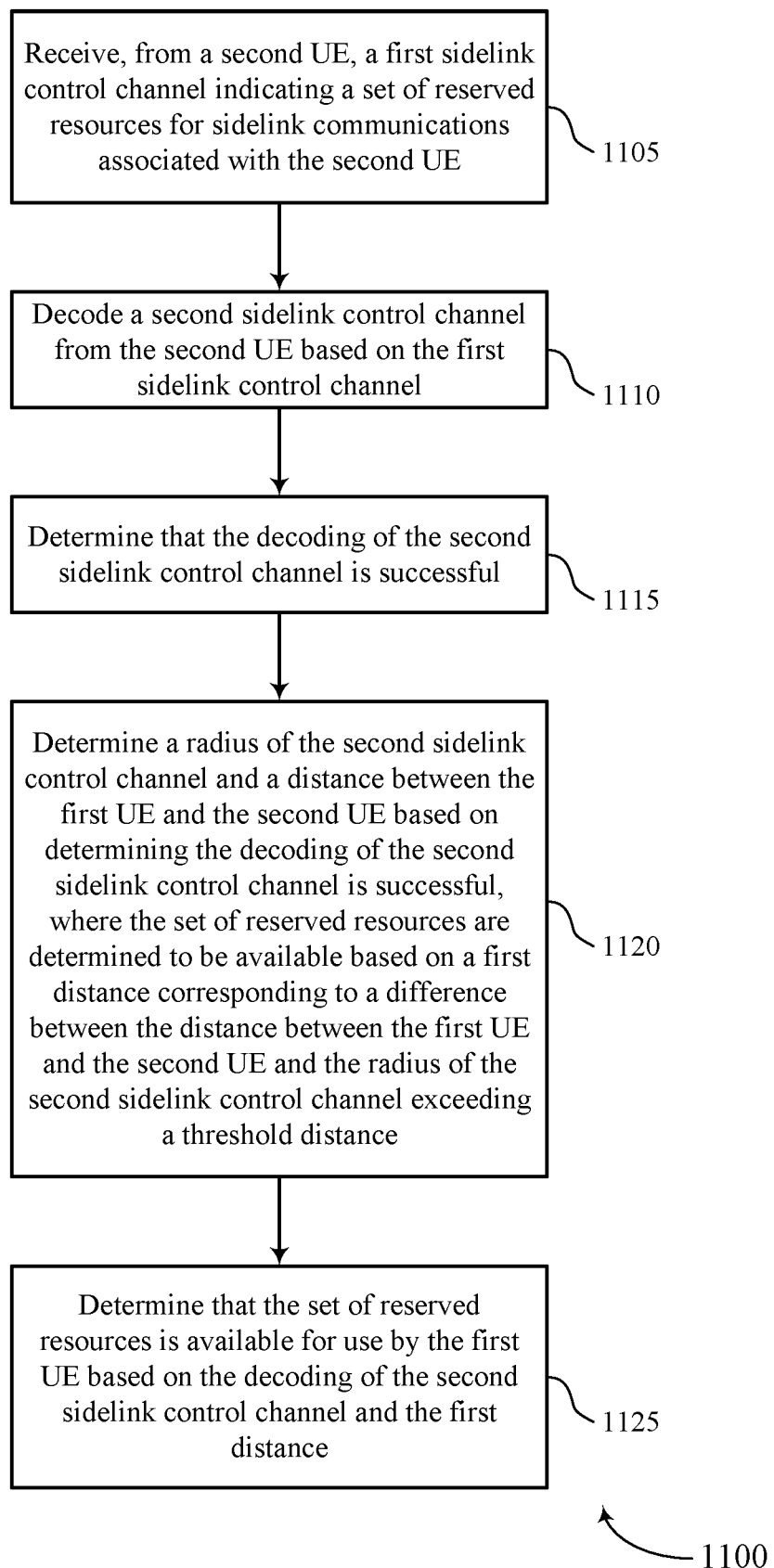

FIG. 11 shows a flowchart illustrating a method 1100 that supports spatial reuse for sidelink communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive, from a second UE, a first sidelink control channel indicating a set of reserved resources for sidelink communications associated with the second UE. The operations of 1105 may be performed according to the methods described herein. In some examples, aspects of the operations of 1105 may be performed by a sidelink control receiver as described with reference to FIGS. 6 through 9.

At 1110, the UE may decode a second sidelink control channel from the second UE based on the first sidelink control channel. The operations of 1110 may be performed according to the methods described herein. In some examples, aspects of the operations of 1110 may be performed by a sidelink control decoder as described with reference to FIGS. 6 through 9.

At 1115, the UE may determine that the decoding of the second sidelink control channel is successful. The operations of 1115 may be performed according to the methods described herein. In some examples, aspects of the operations of 1115 may be performed by a sidelink control decoder as described with reference to FIGS. 6 through 9.

At 1120, the UE may determine a radius of the second sidelink control channel and a distance between the first UE and the second UE based on determining that the decoding of the second sidelink control channel is successful, where the set of reserved resources are determined to be available based on a first distance corresponding to a difference between the distance between the first UE and the second UE and the radius of the second sidelink control channel exceeding a threshold distance. The operations of 1120 may be performed according to the methods described herein. In some examples, aspects of the operations of 1120 may be performed by a distance component as described with reference to FIGS. 6 through 9.

At 1125, the UE may determine that the set of reserved resources is available for use by the first UE based on the decoding of the second sidelink control channel and the first distance. The operations of 1125 may be performed according to the methods described herein. In some examples, aspects of the operations of 1125 may be performed by a reserved resource manager as described with reference to FIGS. 6 through 9.

Figure 12:
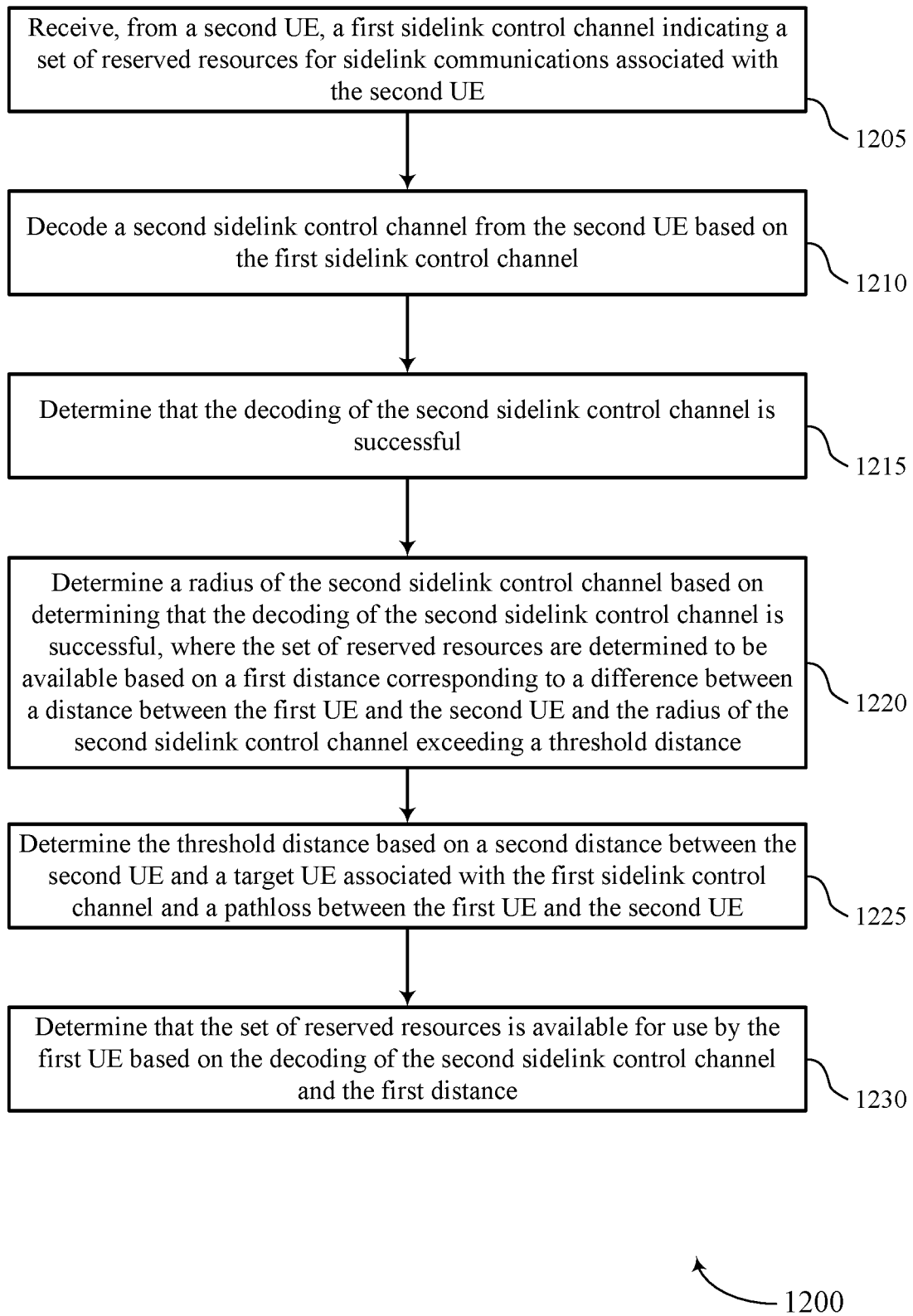

FIG. 12 shows a flowchart illustrating a method 1200 that supports spatial reuse for sidelink communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may receive, from a second UE, a first sidelink control channel indicating a set of reserved resources for sidelink communications associated with the second UE. The operations of 1205 may be performed according to the methods described herein. In some examples, aspects of the operations of 1205 may be performed by a sidelink control receiver as described with reference to FIGS. 6 through 9.

At 1210, the UE may decode a second sidelink control channel from the second UE based on the first sidelink control channel. The operations of 1210 may be performed according to the methods described herein. In some examples, aspects of the operations of 1210 may be performed by a sidelink control decoder as described with reference to FIGS. 6 through 9.

At 1215, the UE may determine that the decoding of the second sidelink control channel is successful. The operations of 1215 may be performed according to the methods described herein. In some examples, aspects of the operations of 1215 may be performed by a sidelink control decoder as described with reference to FIGS. 6 through 9.

At 1220, the UE may determine a radius of the second sidelink control channel based on determining that the decoding of the second sidelink control channel is successful, where the set of reserved resources are determined to be available based on a first distance corresponding to a difference between a distance between the first UE and the second UE and the radius of the second sidelink control channel exceeding a threshold distance. The operations of 1220 may be performed according to the methods described herein. In some examples, aspects of the operations of 1220 may be performed by a distance component as described with reference to FIGS. 6 through 9.

At 1225, the UE may determine the threshold distance based on a second distance between the second UE and a target UE associated with the first sidelink control channel and a pathloss between the first UE and the second UE. The operations of 1225 may be performed according to the methods described herein. In some examples, aspects of the operations of 1225 may be performed by a distance component as described with reference to FIGS. 6 through 9.

At 1230, the UE may determine that the set of reserved resources is available for use by the first UE based on the decoding of the second sidelink control channel and the first distance. The operations of 1230 may be performed according to the methods described herein. In some examples, aspects of the operations of 1230 may be performed by a reserved resource manager as described with reference to FIGS. 6 through 9.

Figure 13:
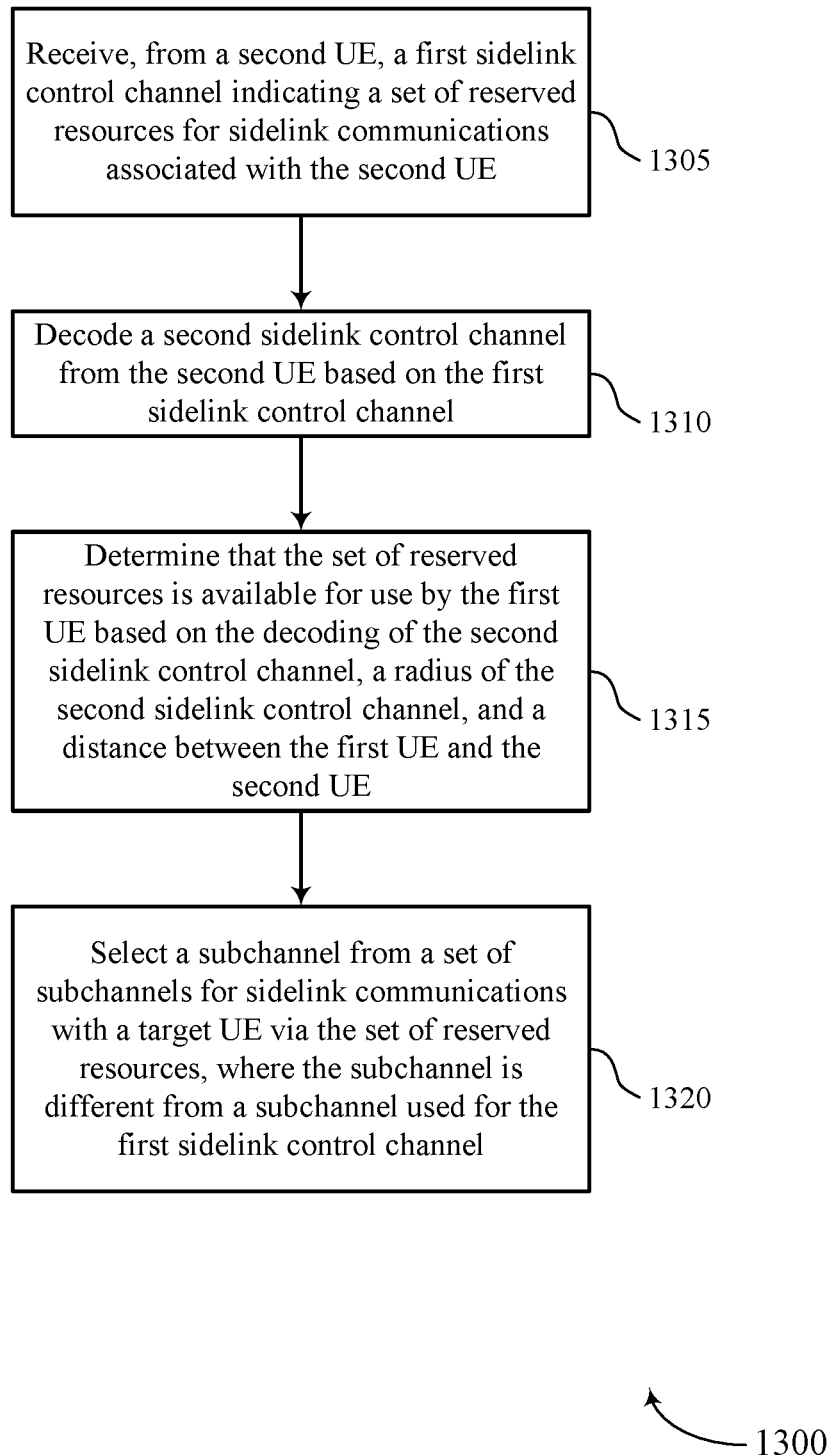

FIG. 13 shows a flowchart illustrating a method 1300 that supports spatial reuse for sidelink communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive, from a second UE, a first sidelink control channel indicating a set of reserved resources for sidelink communications associated with the second UE. The operations of 1305 may be performed according to the methods described herein. In some examples, aspects of the operations of 1305 may be performed by a sidelink control receiver as described with reference to FIGS. 6 through 9.

At 1310, the UE may decode a second sidelink control channel from the second UE based on the first sidelink control channel. The operations of 1310 may be performed according to the methods described herein. In some examples, aspects of the operations of 1310 may be performed by a sidelink control decoder as described with reference to FIGS. 6 through 9.

At 1315, the UE may determine that the set of reserved resources is available for use by the first UE based on the decoding of the second sidelink control channel, a radius of the second sidelink control channel, and a distance between the first UE and the second UE. The operations of 1315 may be performed according to the methods described herein. In some examples, aspects of the operations of 1315 may be performed by a reserved resource manager as described with reference to FIGS. 6 through 9.

At 1320, the UE may select a subchannel from a set of subchannels for sidelink communications with a target UE via the set of reserved resources, where the subchannel is different from a subchannel used for the first sidelink control channel. The operations of 1320 may be performed according to the methods described herein. In some examples, aspects of the operations of 1320 may be performed by a subchannel component as described with reference to FIGS. 6 through 9.

Figure 14:
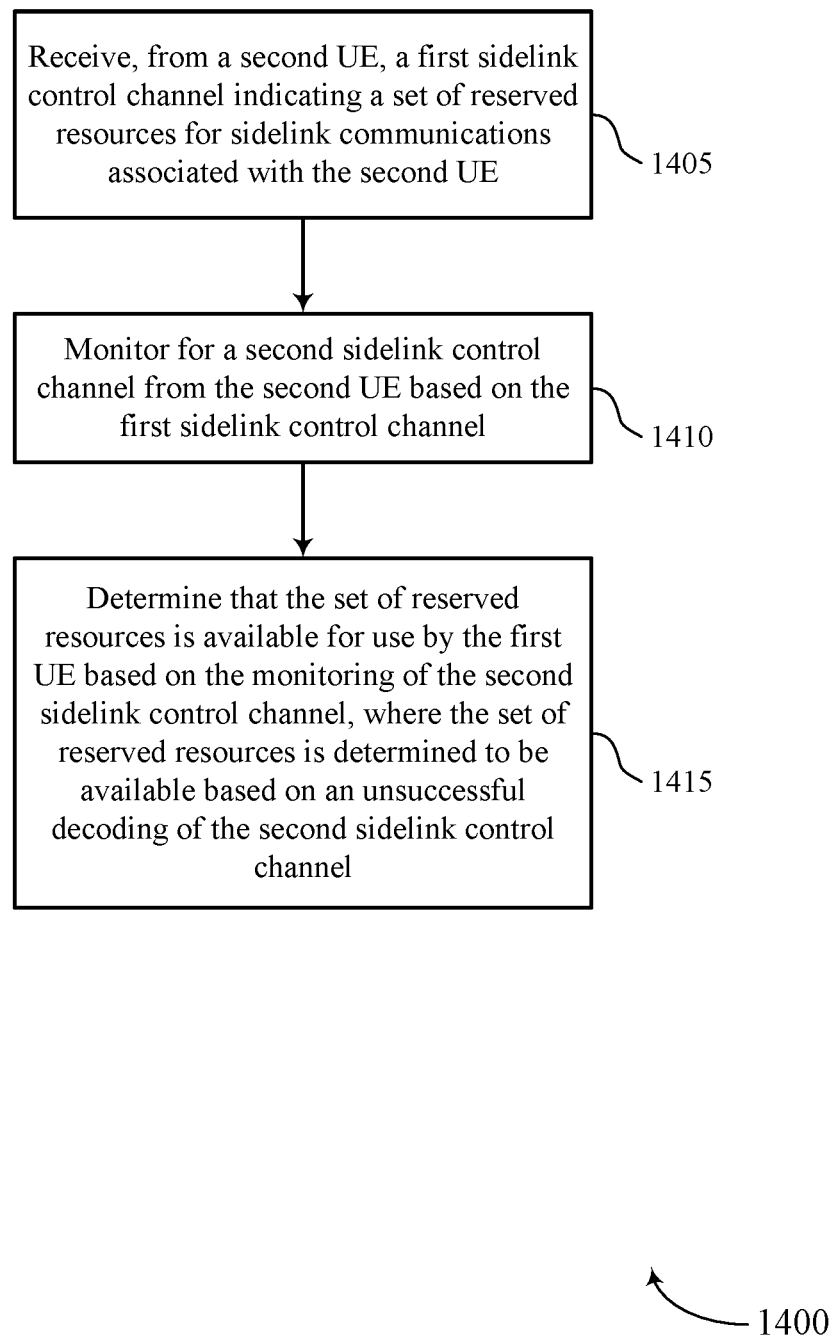

FIG. 14 shows a flowchart illustrating a method 1400 that supports spatial reuse for sidelink communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a second UE, a first sidelink control channel indicating a set of reserved resources for sidelink communications associated with the second UE. The operations of 1405 may be performed according to the methods described herein. In some examples, aspects of the operations of 1405 may be performed by a sidelink control receiver as described with reference to FIGS. 6 through 9.

At 1410, the UE may monitor for a second sidelink control channel from the second UE based on the first sidelink control channel. The operations of 1410 may be performed according to the methods described herein. In some examples, aspects of the operations of 1410 may be performed by a sidelink control monitor as described with reference to FIGS. 6 through 9.

At 1415, the UE may determine that the set of reserved resources is available for use by the first UE based on the monitoring of the second sidelink control channel, where the set of reserved resources is determined to be available based on an unsuccessful decoding of the second sidelink control channel. The operations of 1415 may be performed according to the methods described herein. In some examples, aspects of the operations of 1415 may be performed by a reserved resource manager as described with reference to FIGS. 6 through 9.

Figure 15:
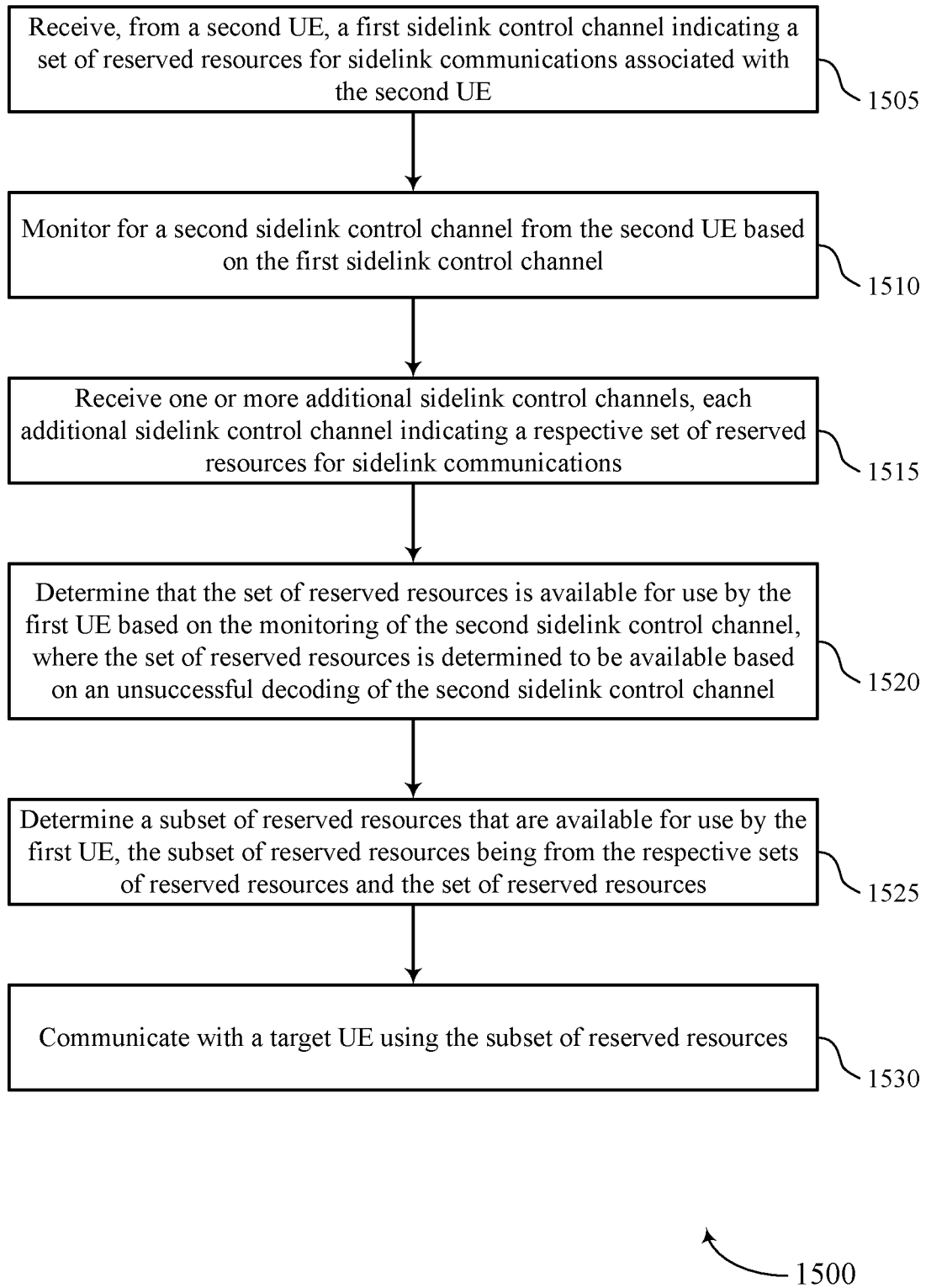

FIG. 15 shows a flowchart illustrating a method 1500 that supports spatial reuse for sidelink communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a second UE, a first sidelink control channel indicating a set of reserved resources for sidelink communications associated with the second UE. The operations of 1505 may be performed according to the methods described herein. In some examples, aspects of the operations of 1505 may be performed by a sidelink control receiver as described with reference to FIGS. 6 through 9.

At 1510, the UE may monitor for a second sidelink control channel from the second UE based on the first sidelink control channel. The operations of 1510 may be performed according to the methods described herein. In some examples, aspects of the operations of 1510 may be performed by a sidelink control monitor as described with reference to FIGS. 6 through 9.

At 1515, the UE may receive one or more additional sidelink control channels, each additional sidelink control channel indicating a respective set of reserved resources for sidelink communications. The operations of 1515 may be performed according to the methods described herein. In some examples, aspects of the operations of 1515 may be performed by a sidelink control receiver as described with reference to FIGS. 6 through 9.

At 1520, the UE may determine that the set of reserved resources is available for use by the first UE based on the monitoring of the second sidelink control channel, where the set of reserved resources is determined to be available based on an unsuccessful decoding of the second sidelink control channel. The operations of 1520 may be performed according to the methods described herein. In some examples, aspects of the operations of 1520 may be performed by a reserved resource manager as described with reference to FIGS. 6 through 9.

At 1525, the UE may determine a subset of reserved resources that are available for use by the first UE, the subset of reserved resources being from the respective sets of reserved resources and the set of reserved resources. The operations of 1525 may be performed according to the methods described herein. In some examples, aspects of the operations of 1525 may be performed by a reserved resource manager as described with reference to FIGS. 6 through 9.

At 1530, the UE may communicate with a target UE using the subset of reserved resources. The operations of 1530 may be performed according to the methods described herein. In some examples, aspects of the operations of 1530 may be performed by a sidelink communications manager as described with reference to FIGS. 6 through 9.

Figure 16:
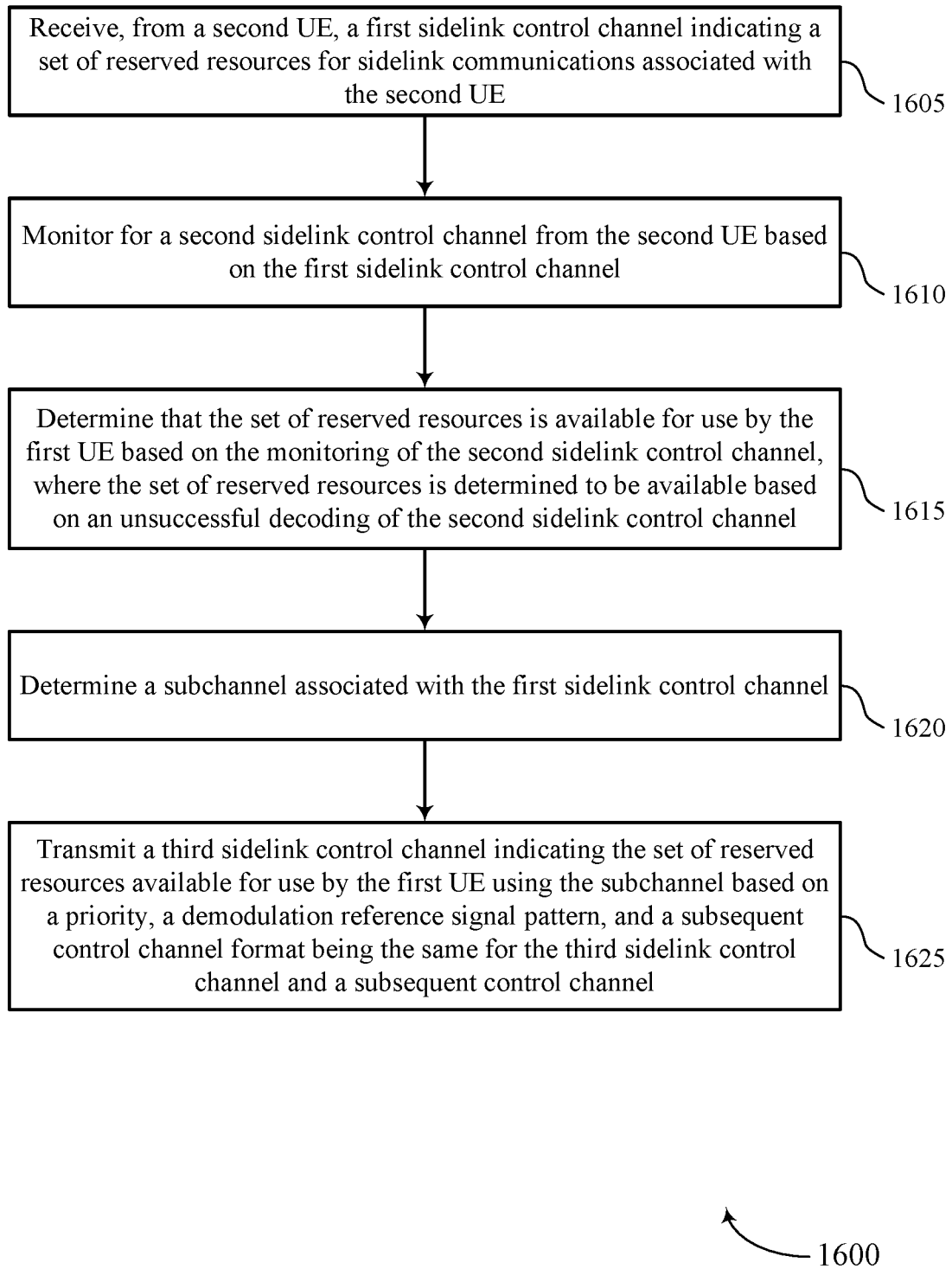

FIG. 16 shows a flowchart illustrating a method 1600 that supports spatial reuse for sidelink communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a second UE, a first sidelink control channel indicating a set of reserved resources for sidelink communications associated with the second UE. The operations of 1605 may be performed according to the methods described herein. In some examples, aspects of the operations of 1605 may be performed by a sidelink control receiver as described with reference to FIGS. 6 through 9.

At 1610, the UE may monitor for a second sidelink control channel from the second UE based on the first sidelink control channel. The operations of 1610 may be performed according to the methods described herein. In some examples, aspects of the operations of 1610 may be performed by a sidelink control monitor as described with reference to FIGS. 6 through 9.

At 1615, the UE may determine that the set of reserved resources is available for use by the first UE based on the monitoring of the second sidelink control channel, where the set of reserved resources is determined to be available based on an unsuccessful decoding of the second sidelink control channel. The operations of 1615 may be performed according to the methods described herein. In some examples, aspects of the operations of 1615 may be performed by a reserved resource manager as described with reference to FIGS. 6 through 9.

At 1620, the UE may determine a subchannel associated with the first sidelink control channel. The operations of 1620 may be performed according to the methods described herein. In some examples, aspects of the operations of 1620 may be performed by a subchannel component as described with reference to FIGS. 6 through 9.

At 1625, the UE may transmit a third sidelink control channel indicating the set of reserved resources available for use by the first UE using the subchannel based on a priority, a demodulation reference signal pattern, and a subsequent control channel format being the same for the third sidelink control channel and a subsequent control channel. The operations of 1625 may be performed according to the methods described herein. In some examples, aspects of the operations of 1625 may be performed by a sidelink control transmitter as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: receiving, from a second UE, a first sidelink control channel indicating a set of reserved resources for sidelink communications associated with the second UE; decoding a second sidelink control channel from the second UE based at least in part on the first sidelink control channel; and determining that the set of reserved resources is available for use by the first UE based at least in part on the decoding of the second sidelink control channel, a radius of the second sidelink control channel, and a distance between the first UE and the second UE.

Aspect 2: The method of aspect 1, further comprising: determining that the decoding of the second sidelink control channel is successful; and determining the radius of the second sidelink control channel based at least in part on determining that the decoding of the second sidelink control channel is successful, wherein the set of reserved resources are determined to be available based at least in part on a first distance corresponding to a difference between the distance between the first UE and the second UE and the radius of the second sidelink control channel exceeding a threshold distance.

Aspect 3: The method of aspect 2, further comprising: determining the threshold distance based at least in part on a second distance between the second UE and a target UE associated with the first sidelink control channel and a pathloss between the first UE and the second UE.

Aspect 4: The method of aspect 3, further comprising: identifying an MCS, a beta offset, a control format, or any combination thereof associated with the second sidelink control channel based at least in part on the decoding of the first sidelink control channel; and determining the second distance between the second UE and the target UE based at least in part on the MCS, the beta offset, the control format, or any combination thereof associated with the second sidelink control channel.

Aspect 5: The method of any of aspects 3 through 4, further comprising: receiving a reference signal with the first sidelink control channel, the second sidelink control channel, or a sidelink data channel, or any combination thereof, wherein the pathloss between the first UE and the second UE is determined based at least in part on a power measurement associated with the reference signal.

Aspect 6: The method of aspect 5, wherein the power measurement is an RSRP, an RSSI, or a combination thereof.

Aspect 7: The method of any of aspects 2 through 6, further comprising: determining the threshold distance based at least in part on an alpha factor corresponding to a pathloss exponent, an SINR target, a spatial transmission type, or any combination thereof.

Aspect 8: The method of any of aspects 1 through 7, further comprising: determining a transmit power for communicating with a target UE using the set of reserved resources based at least in part on the radius of the second sidelink control channel and the distance between the first UE and the second UE.

Aspect 9: The method of any of aspects 1 through 8, further comprising: receiving one or more additional sidelink control channels, each additional sidelink control channel indicating a respective set of reserved resources for sidelink communications; determining a subset of reserved resources that are available for use by the first UE, the subset of reserved resources being from the respective sets of reserved resources and the set of reserved resources; and communicating with a target UE using the subset of reserved resources.

Aspect 10: The method of aspect 9, further comprising: determining the subset of reserved resources based at least in part on respective transmit powers for the one or more additional sidelink control channels.

Aspect 11: The method of aspect 9, further comprising: determining respective distances for the one or more additional sidelink control channels based at least in part on respective successful decoding procedures for the one or more additional sidelink control channels; and determining the subset of reserved resources based at least in part on the respective distances associated with the one or more additional sidelink control channels.

Aspect 12: The method of any of aspects 1 through 11, further comprising: selecting a subchannel from a set of subchannels for sidelink communications with a target UE via the set of reserved resources, wherein the subchannel is different from a subchannel used for the first sidelink control channel.

Aspect 13: The method of any of aspects 1 through 11, further comprising: receiving an indication of a subchannel index of the first sidelink control channel within a field of the first sidelink control channel; and selecting a subchannel from a set of subchannels for sidelink communications with a target UE via the set of reserved resources, wherein the subchannel is associated with an index different from the subchannel index.

Aspect 14: The method of any of aspects 1 through 11, further comprising: determining a subchannel associated with the first sidelink control channel; and transmitting a third sidelink control channel indicating the set of reserved resources available for use by the first UE using the subchannel based at least in part on a priority, a DMRS pattern, and a subsequent control channel format being the same for the third sidelink control channel and a subsequent control channel.

Aspect 15: The method of any of aspects 1 through 14, further comprising: communicating with a target UE via the set of reserved resources based at least in part on determining that the set of reserved resources is available for use by the first UE.

Aspect 16: A method for wireless communications at a first UE, comprising: receiving, from a second UE, a first sidelink control channel indicating a set of reserved resources for sidelink communications associated with the second UE; monitoring for a second sidelink control channel from the second UE based at least in part on the first sidelink control channel; and determining that the set of reserved resources is available for use by the first UE based at least in part on the monitoring of the second sidelink control channel, wherein the set of reserved resources is determined to be available based at least in part on an unsuccessful decoding of the second sidelink control channel.

Aspect 17: The method of aspect 16, further comprising: receiving one or more additional sidelink control channels, each additional sidelink control channel indicating a respective set of reserved resources for sidelink communications; determining a subset of reserved resources that are available for use by the first UE, the subset of reserved resources being from the respective sets of reserved resources and the set of reserved resources; and communicating with a target UE using the subset of reserved resources.

Aspect 18: The method of aspect 17, further comprising: determining the subset of reserved resources based at least in part on respective transmit powers for the one or more additional sidelink control channels.

Aspect 19: The method of any of aspects 16 through 18, further comprising: selecting a subchannel from a set of subchannels for sidelink communications with a target UE via the set of reserved resources, wherein the subchannel is different from a subchannel used for the first sidelink control channel.

Aspect 20: The method of any of aspects 16 through 18, further comprising: receiving an indication of a subchannel index of the first sidelink control channel within a field of the first sidelink control channel; and selecting a subchannel from a set of subchannels for sidelink communications with a target UE via the set of reserved resources, wherein the subchannel is associated with an index different from the subchannel index.

Aspect 21: The method of any of aspects 16 through 18, further comprising: determining a subchannel associated with the first sidelink control channel; and transmitting a third sidelink control channel indicating the set of reserved resources available for use by the first UE using the subchannel based at least in part on a priority, a DMRS pattern, and a subsequent control channel format being the same for the third sidelink control channel and a subsequent control channel.

Aspect 22: The method of any of aspects 16 through 21, further comprising: communicating with a target UE via the set of reserved resources based at least in part on determining that the set of reserved resources is available for use by the first UE.

Aspect 23: The method of any of aspects 16 through 22, further comprising: determining a transmit power for communicating with a target UE via the set of reserved resources based at least in part on the unsuccessful decoding of the second sidelink control channel.

Aspect 24: An apparatus for wireless communications at a first UE, comprising a processor; memory coupled with the processor; and instructions stored in the memory and executable by the processor to cause the apparatus to perform a method of any of aspects 1 through 15.

Aspect 25: An apparatus for wireless communications at a first UE, comprising at least one means for performing a method of any of aspects 1 through 15.

Aspect 26: A non-transitory computer-readable medium storing code for wireless communications at a first UE, the code comprising instructions executable by a processor to perform a method of any of aspects 1 through 15.

Aspect 27: An apparatus for wireless communications at a first UE, comprising a processor; memory coupled with the processor; and instructions stored in the memory and executable by the processor to cause the apparatus to perform a method of any of aspects 16 through 23.

Aspect 28: An apparatus for wireless communications at a first UE, comprising at least one means for performing a method of any of aspects 16 through 23.

Aspect 29: A non-transitory computer-readable medium storing code for wireless communications at a first UE, the code comprising instructions executable by a processor to perform a method of any of aspects 16 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, from a second UE, a first sidelink control channel indicating a set of reserved resources for sidelink communications associated with the second UE;
   decoding a second sidelink control channel from the second UE based at least in part on the first sidelink control channel; and
   determining that the set of reserved resources is available for use by the first UE based at least in part on the decoding of the second sidelink control channel, a radius of the second sidelink control channel, and a distance between the first UE and the second UE.

2. The method of claim 1, further comprising:
   determining that the decoding of the second sidelink control channel is successful; and
   determining the radius of the second sidelink control channel based at least in part on determining that the decoding of the second sidelink control channel is successful, wherein the set of reserved resources are determined to be available based at least in part on a first distance corresponding to the radius of the second sidelink control channel and the distance between the first UE and the second UE exceeding a threshold distance.

3. The method of claim 2, further comprising:
   determining the threshold distance based at least in part on a second distance between the second UE and a target UE associated with the first sidelink control channel and a pathloss between the first UE and the second UE.

4. The method of claim 3, further comprising:
   identifying a modulation and coding scheme (MCS), a beta offset, a control format, or any combination thereof associated with the second sidelink control channel based at least in part on the decoding of the first sidelink control channel; and determining the second distance between the second UE and the target UE based at least in part on the MCS, the beta offset, the control format, or any combination thereof associated with the second sidelink control channel.

5. The method of claim 3, further comprising:
receiving a reference signal with the first sidelink control channel, the second sidelink control channel, or a sidelink data channel, or any combination thereof, wherein the pathloss between the first UE and the second UE is determined based at least in part on a power measurement associated with the reference signal.

6. The method of claim 5, wherein the power measurement is a reference signal received power (RSRP), a reference signal strength indicator (RSSI), or a combination thereof.

7. The method of claim 2, further comprising:
determining the threshold distance based at least in part on an alpha factor corresponding to a pathloss exponent, a signal to interference plus noise ratio (SINR) target, a spatial transmission type, or any combination thereof.

8. The method of claim 1, further comprising:
determining a transmit power for communicating with a target UE using the set of reserved resources based at least in part on the radius of the second sidelink control channel and the distance between the first UE and the second UE.

9. The method of claim 1, further comprising:
receiving one or more additional sidelink control channels, each additional sidelink control channel indicating a respective set of reserved resources for sidelink communications;
determining a subset of reserved resources that are available for use by the first UE, the subset of reserved resources being from the respective sets of reserved resources and the set of reserved resources; and
communicating with a target UE using the subset of reserved resources.

10. The method of claim 9, further comprising:
determining the subset of reserved resources based at least in part on respective transmit powers for the one or more additional sidelink control channels.

11. The method of claim 9, further comprising:
determining respective distances for the one or more additional sidelink control channels based at least in part on respective successful decoding procedures for the one or more additional sidelink control channels; and
determining the subset of reserved resources based at least in part on the respective distances associated with the one or more additional sidelink control channels.

12. The method of claim 1, further comprising:
selecting a subchannel from a set of subchannels for sidelink communications with a target UE via the set of reserved resources, wherein the subchannel is different from a subchannel used for the first sidelink control channel.

13. The method of claim 1, further comprising:
receiving an indication of a subchannel index of the first sidelink control channel within a field of the first sidelink control channel; and
selecting a subchannel from a set of subchannels for sidelink communications with a target UE via the set of reserved resources, wherein the subchannel is associated with an index different from the subchannel index.

14. The method of claim 1, further comprising:
determining a subchannel associated with the first sidelink control channel; and
transmitting a third sidelink control channel indicating the set of reserved resources available for use by the first UE using the subchannel based at least in part on a priority, a demodulation reference signal pattern, and a subsequent control channel format being the same for the third sidelink control channel and a subsequent control channel.

15. The method of claim 1, further comprising:
communicating with a target UE via the set of reserved resources based at least in part on determining that the set of reserved resources is available for use by the first UE.

16. A method for wireless communications at a first user equipment (UE), comprising:
receiving, from a second UE, a first sidelink control channel indicating a set of reserved resources for sidelink communications associated with the second UE;
monitoring for a second sidelink control channel from the second UE based at least in part on the first sidelink control channel; and
determining that the set of reserved resources is available for use by the first UE based at least in part on the monitoring of the second sidelink control channel, wherein the set of reserved resources is determined to be available based at least in part on an unsuccessful decoding of the second sidelink control channel.

17. The method of claim 16, further comprising:
receiving one or more additional sidelink control channels, each additional sidelink control channel indicating a respective set of reserved resources for sidelink communications;
determining a subset of reserved resources that are available for use by the first UE, the subset of reserved resources being from the respective sets of reserved resources and the set of reserved resources; and
communicating with a target UE using the subset of reserved resources.

18. The method of claim 17, further comprising:
determining the subset of reserved resources based at least in part on respective transmit powers for the one or more additional sidelink control channels.

19. The method of claim 16, further comprising:
selecting a subchannel from a set of subchannels for sidelink communications with a target UE via the set of reserved resources, wherein the subchannel is different from a subchannel used for the first sidelink control channel.

20. The method of claim 16, further comprising:
receiving an indication of a subchannel index of the first sidelink control channel within a field of the first sidelink control channel; and
selecting a subchannel from a set of subchannels for sidelink communications with a target UE via the set of reserved resources, wherein the subchannel is associated with an index different from the subchannel index.

21. The method of claim 16, further comprising:
determining a subchannel associated with the first sidelink control channel; and
transmitting a third sidelink control channel indicating the set of reserved resources available for use by the first UE using the subchannel based at least in part on a priority, a demodulation reference signal pattern, and a subsequent control channel format being the same for the third sidelink control channel and a subsequent control channel.

22. The method of claim 16, further comprising:
communicating with a target UE via the set of reserved resources based at least in part on determining that the set of reserved resources is available for use by the first UE.

23. The method of claim 16, further comprising:
determining a transmit power for communicating with a target UE via the set of reserved resources based at least in part on the unsuccessful decoding of the second sidelink control channel.

24. An apparatus for wireless communications at a first user equipment (UE), comprising:
a processor,
memory coupled with the processor; and
instructions stored in the memory and executable by the processor to cause the apparatus to:
receive, from a second UE, a first sidelink control channel indicating a set of reserved resources for sidelink communications associated with the second UE;
decode a second sidelink control channel from the second UE based at least in part on the first sidelink control channel; and
determine that the set of reserved resources is available for use by the first UE based at least in part on the decoding of the second sidelink control channel, a radius of the second sidelink control channel, and a distance between the first UE and the second UE.

25. The apparatus of claim 24, the instructions further executable by the processor to cause the apparatus to:
determine that the decoding of the second sidelink control channel is successful; and
determine the radius of the second sidelink control channel based at least in part on determining that the decoding of the second sidelink control channel is successful, wherein the set of reserved resources are determined to be available based at least in part on a first distance corresponding to a difference between the distance between the first UE and the second UE and the radius of the second sidelink control channel exceeding a threshold distance.

26. The apparatus of claim 25, the instructions further executable by the processor to cause the apparatus to:
determine the threshold distance based at least in part on a second distance between the second UE and a target UE associated with the first sidelink control channel and a pathloss between the first UE and the second UE.

27. The apparatus of claim 26, further comprising:
identify a modulation and coding scheme (MCS), a beta offset, a control format, or any combination thereof associated with the second sidelink control channel based at least in part on the decoding of the first sidelink control channel; and
determine the second distance between the second UE and the target UE based at least in part on the MCS, the beta offset, the control format, or any combination thereof associated with the second sidelink control channel.

28. An apparatus for wireless communications at a first user equipment (UE), comprising:
a processor,
memory coupled with the processor; and
instructions stored in the memory and executable by the processor to cause the apparatus to:
receive, from a second UE, a first sidelink control channel indicating a set of reserved resources for sidelink communications associated with the second UE;
monitor for a second sidelink control channel from the second UE based at least in part on the first sidelink control channel; and
determine that the set of reserved resources is available for use by the first UE based at least in part on the monitoring of the second sidelink control channel, wherein the set of reserved resources is determined to be available based at least in part on an unsuccessful decoding of the second sidelink control channel.

29. The apparatus of claim 28, the instructions further executable by the processor to cause the apparatus to:
receive one or more additional sidelink control channels, each additional sidelink control channel indicating a respective set of reserved resources for sidelink communications;
determine a subset of reserved resources that are available for use by the first UE, the subset of reserved resources being from the respective sets of reserved resources and the set of reserved resources; and
communicate with a target UE using the subset of reserved resources.

30. The apparatus of claim 29, the instructions further executable by the processor to cause the apparatus to:
determine the subset of reserved resources based at least in part on respective transmit powers for the one or more additional sidelink control channels.

* * * * *